(12) United States Patent
Wright et al.

(10) Patent No.: US 9,894,050 B1
(45) Date of Patent: Feb. 13, 2018

(54) SERVER BASED SETTINGS FOR CLIENT SOFTWARE WITH ASYMMETRIC SIGNING

(71) Applicant: GOOGLE INC., Mountain View, CA (US)

(72) Inventors: Erik Lewis Wright, Montreal (CA); Erik Kay, Emerald Hills, CA (US); Robert Shield, Vaudreuil-Dorion (CA)

(73) Assignee: GOOGLE LLC, Mountain View, CA (US)

( * ) Notice: Subject to any disclaimer, the term of this patent is extended or adjusted under 35 U.S.C. 154(b) by 169 days.

(21) Appl. No.: 14/823,522

(22) Filed: Aug. 11, 2015

Related U.S. Application Data

(60) Provisional application No. 62/035,848, filed on Aug. 11, 2014.

(51) Int. Cl.
*G06F 7/04* (2006.01)
*G06F 15/16* (2006.01)
*G06F 17/30* (2006.01)
*H04L 29/06* (2006.01)

(52) U.S. Cl.
CPC ........ *H04L 63/08* (2013.01); *G06F 17/30876* (2013.01)

(58) Field of Classification Search
CPC ....................................................... H04L 63/08
USPC ............................................................ 726/6
See application file for complete search history.

(56) References Cited

U.S. PATENT DOCUMENTS

| 6,934,853 B2 * | 8/2005 | Christopherson ....... H04L 67/42 707/999.009 |
| 8,561,156 B2 * | 10/2013 | Matsuda ............. G06F 21/6218 726/6 |
| 9,009,805 B1 * | 4/2015 | Kirkby ............... G06K 9/00711 709/203 |
| 2005/0138384 A1 * | 6/2005 | Brickell .................. G06F 21/57 713/182 |

(Continued)

OTHER PUBLICATIONS

"How to Sync Your Browser Data in Any Browser and Access it Anywhere", retrieved on Jul. 6, 2015 from http://www.howtogeek.com/139179/howtosyncyourbrowserdatainanybrowserandaccessitanywhere/, 6 pages.

(Continued)

*Primary Examiner* — Dant Shaifer Harriman
(74) *Attorney, Agent, or Firm* — Brake Hughes Bellermann LLP

(57) ABSTRACT

In one general aspect, a method can include receiving, by an application running on a computing device, an indication that a user of the computing device has been authenticated, and receiving a selection of a settings page, the settings page associated with the application and the user. The method can further include requesting the settings page for display on a display device included in the computing device, and receiving the settings page including a value for a preference for a setting included on the settings page, the value for the preference being signed by a private key associated with the user. The method can further include validating, by the application, the value for the preference using a public key associated with the application, and based on the validation, displaying, by the display device, the settings page including an indication of the value of the preference for the setting.

18 Claims, 13 Drawing Sheets

(56) References Cited

U.S. PATENT DOCUMENTS

| | | | | |
|---|---|---|---|---|
| 2011/0302639 A1* | 12/2011 | Matsuda | ............. | G06F 21/6218 726/6 |
| 2012/0011358 A1* | 1/2012 | Masone | ................ | G06F 21/305 713/153 |
| 2012/0096637 A1* | 4/2012 | Laflamme | .......... | A61H 33/0087 4/559 |
| 2014/0230031 A1* | 8/2014 | Schneider | ............... | H04L 63/08 726/6 |
| 2015/0106887 A1* | 4/2015 | Aslund | ............... | H04L 63/0492 726/5 |
| 2015/0189509 A1* | 7/2015 | Sheikh | ................... | H04L 63/10 726/4 |
| 2016/0156598 A1* | 6/2016 | Alonso Cebrian | . | H04L 63/0838 713/168 |

OTHER PUBLICATIONS

Gordon, "Top 10 Clever Uses for Dropbox", Aug. 11, 2012, 10 pages.

Schilit, et al., "Customizing Mobile Applications", Proceedings USENIX Symposium on Mobile & Location-indendent Computing, Aug. 1993, 9 pages.

* cited by examiner

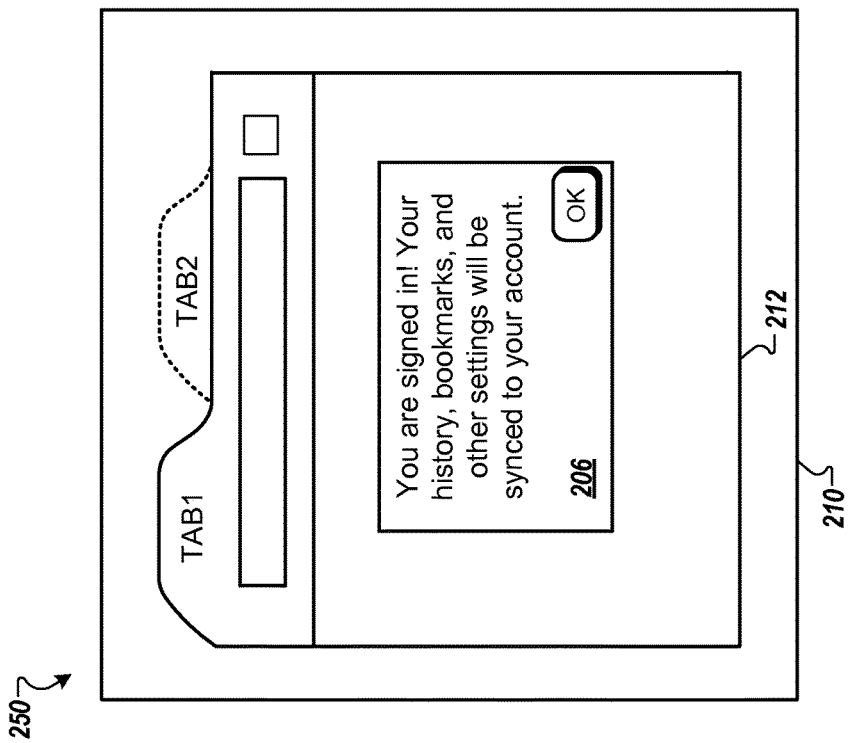
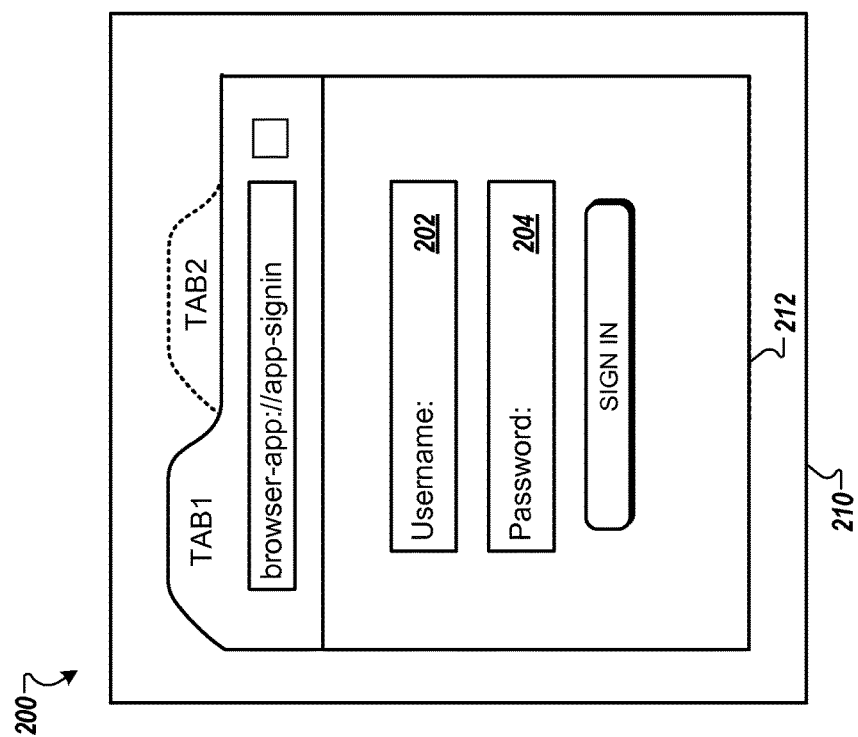
FIG. 2A
FIG. 2B

SERVER BASED SETTINGS FOR CLIENT SOFTWARE WITH ASYMMETRIC SIGNING

CROSS-REFERENCE TO RELATED APPLICATION

This application is a non-provisional of, and claims priority under 35 U.S.C. § 119(e)(1), to U.S. Provisional Application Ser. No. 62/035,848, filed on Aug. 11, 2014, and entitled "SERVER BASED SETTINGS FOR CLIENT SOFTWARE WITH ASYMMETRIC SIGNING", the contents of which are hereby incorporated by reference.

TECHNICAL FIELD

This description generally relates to computing devices. The description, in particular, relates to software executing on the computing devices.

BACKGROUND

A user may have one or more applications that they can run available to them on a computing device. Each application can have associated with it one or more settings. The application can access and use the associated settings when, for example, the user initiates the running of the application. These settings may be stored locally on the computing device in association with the application. When launched, the application can use the stored settings to determine one or more default states or conditions for the application. In some cases, the settings may be default settings for the application. In some cases, the settings may be settings defined by the user of the computing device, and stored locally on the computing device based on actions performed by the user prior to, or along with, the launching of the application. In some cases, the absence of a setting value can cause the application to use a hard-coded default value.

SUMMARY

In one general aspect, a method includes receiving, by an application running on a computing device, an indication that a user of the computing device has been authenticated, receiving a selection of a settings page, the settings page associated with the application and the user, requesting the settings page for display on a display device included in the computing device, receiving the settings page including a value for a preference for a setting included on the settings page, the value for the preference being signed by a private key associated with the user, validating, by the application, the value for the preference using a public key associated with the application, and based on the validation, displaying, by the display device, the settings page including an indication of the value of the preference for the setting.

Example implementations may include one or more of the following features. For instance, receiving a selection of the settings page can include launching a front-end application associated with the application and hosted on a computing system remote from the computing device, the front-end application configured to request the settings page, receive the settings page, and cause the settings page to be displayed by the display device. The method can further include, before validating the value for the preference, requesting, by the application, the public key that is associated with the application. The public key can be stored in a database remote from the computing device. Requesting the public key can include requesting that a server, communicatively coupled to the database, provide the public key to the application. The public key can be bundled with the application. The method can further include, based on requesting the settings page for display on a display device included in the computing device, receiving a request for additional criterion for user authentication, and providing the additional criterion. Receiving the settings page including a value for a preference for a setting included on the settings page can be based on the user being further authenticated using the additional criterion.

In another general aspect, a method includes providing, by a computer system to an application running on a computing device, an indication of authentication of a user of the computing device, receiving a request for a settings page for display on the computing device, the settings page associated with the application and the user, and providing, by the computer system to the application running on a computing device, a value for at least one preference for a setting included on the settings page, the value for the preference included in a settings/preferences file and signed by a private key associated with the user, the settings/preferences file stored in a database included in the computer system and associated with the user.

Example implementations may include one or more of the following features. For instance, the request for a settings page can be received from a front-end application associated with the application and hosted on the computer system, and the value for at least one preference for a setting included on the settings page can be provided to the front-end application. The method can further include providing a public key associated with the application, the public key being used by the application to validate the value for at least one preference for the setting included on the settings page. The public key can be stored in a database included in the computer system. The method can further include, based on receiving the request for a settings page, sending a request for additional criterion for user authentication, and receiving the requested additional criterion. Providing, by the computer system to the application running on a computing device, a value for at least one preference for a setting included on the settings page can include accessing user data associated with the user, and authenticating the user based on the additional criterion and the user data.

In another general aspect, a method includes receiving, by a computer and from an application running on a computing device, a value for a preference for a setting included in a settings page displayed on a display device of the computing device, the settings page being associated with the application and with an authenticated user of the application, and storing, by the computer and in a database accessible by the computer, the received value for the preference in a settings/preferences file included in the database and associated with the application and with the authenticated user of the application.

Example implementations may include one or more of the following features. For instance, a private key can be associated with the authenticated user. The method can further include signing the received value for the preference for the setting with the private key. Storing the received value for the preference in a settings/preferences file can include storing the signed value of the setting and storing a signature associated with the signed value. The method can further include, subsequent to storing the received value for the preference in a settings/preferences file, receiving, by the computer and from the application running on the computing device, a request for the stored value for the preference from the authenticated user. The method can further include, in response to receiving the request for the stored value, retrieving, by the computer and from the database, the stored value, and signing the retrieved stored value for the preference for the setting with the private key. The method can further include providing, by the computer and to the application, the signed stored value for the preference for the setting.

In yet another general aspect, a system includes a computing device configured to receive a request for a settings page associated with an authenticated user, the request from an application associated with the authenticated user, and decrypt signed values for preferences for user settings included in the settings page. The system further includes a server configured to authenticate the user, sign the values for the preferences for the user settings included in the settings page, and provide the settings page including the signed values for the preferences for the user settings. The system further includes a database configured to store user data associated with the user, the user data used by the server to authenticate the user, store a settings/preferences file associated with the user that includes the values for the preferences for the user settings, store a private key associated with the user, the private key used by the server for signing the values for the preferences for the user settings, and store a public key associated with an application running on the computing device, the public key used to decrypt the values for the preferences for the user settings signed by the private key.

Example implementations may include one or more of the following features. For instance, the computing device can be further configured to provide a value for a preference for a user setting included in the settings page. The server can be further configured to determine that the value for the preference for the user setting is not a valid value, and based on determining that the value for the preference is not a valid value, not storing the value for the preference in the settings/preferences file. The server can be further configured to host a front-end application associated with the application. The computing device can be further configured to request and receive the settings page from the server using the front-end application. Decrypting signed values for preferences for user settings included in the settings page can include verifying a signature of a signed value using the public key.

The details of one or more implementations are set forth in the accompanying drawings and the description below. Other features will be apparent from the description and drawings, and from the claims.

BRIEF DESCRIPTION OF THE DRAWINGS

FIGS. 2A-B are diagrams that illustrate example user interfaces for signing into a web browser application.

Like reference symbols in the various drawings indicate like elements.

DETAILED DESCRIPTION

Figure 1:
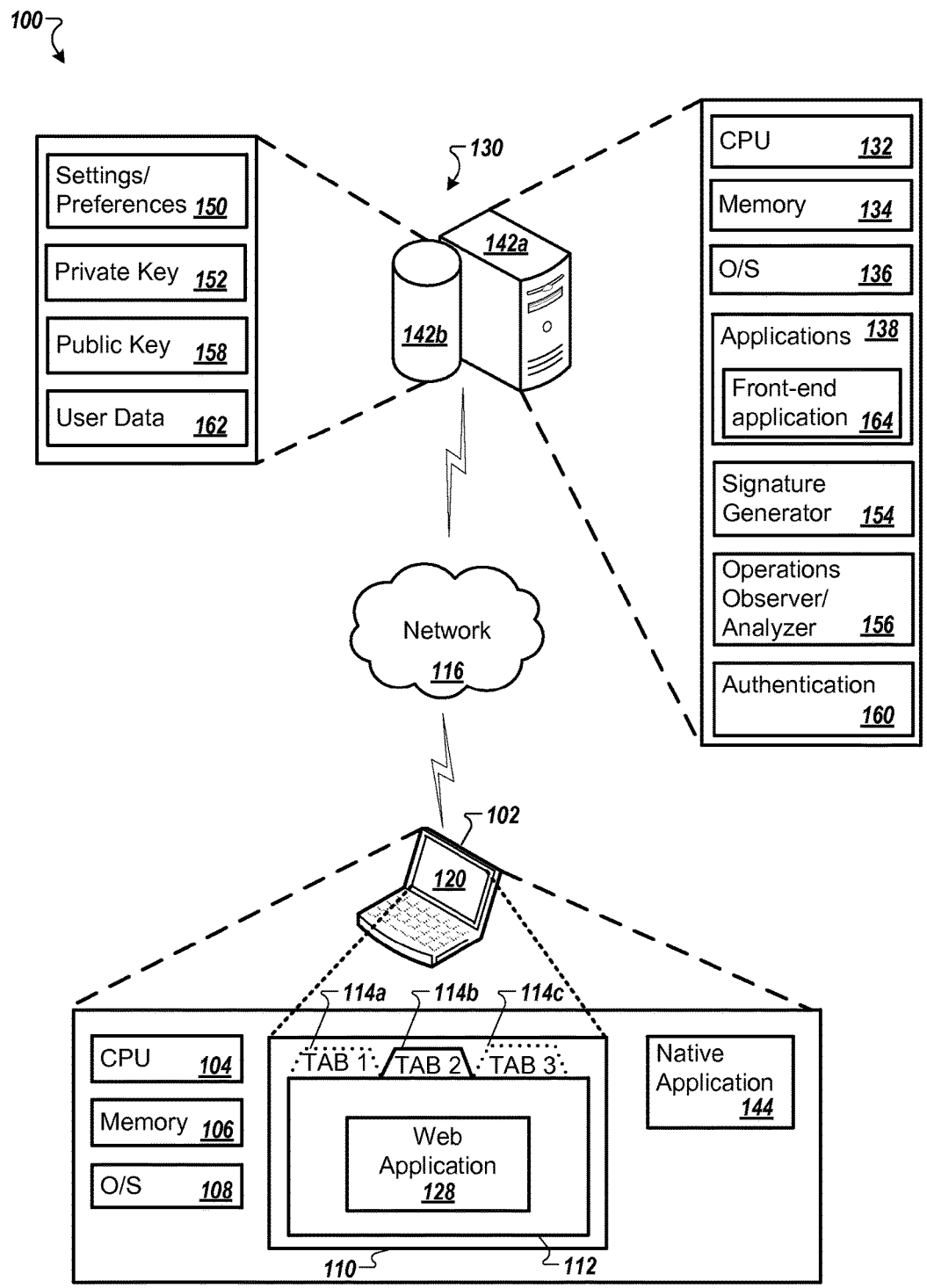
FIG. 1 is a diagram that illustrates an example system to authenticate a user, and sign and provide signed settings for the user.

Software (or applications) that can run (execute) on a computing device may have one or more settings (preferences) associated with them. Each application that can run on a computing device can have associated with it a unique group of settings that the application can access when it is launched by a user of the computing device, or when it is running on the computing device. For example, these settings may control the appearance and default settings for the application when launched. In another example, these settings may control the application's access to data and/or services outside of/remote to the computing device (e.g., located in the cloud, located in a remote storage device, etc.). For example, these settings may control the overall look and feel of the application when running on the computing device (e.g., the application's graphical user interface (GUI)). In some implementations, the user of the computing device may access the settings using the application in order to specify/indicate or otherwise define the settings. In some cases, access to the settings may be restricted to just the application associated with the settings. In a single implementation, a user may not control all available settings. A user may control some settings and may not control other setting.

In some situations, however, another application that is also present on the computing device may access the settings associated with the application. The access may occur based on the applications having similar permissions to access the settings as indicated by the operating system. The access may occur without the permission of the user and, in some cases, without the user having any knowledge of the changes. As such, the operating system, which may oversee or otherwise control access to the settings for individual applications, may allow applications with similar operating system permissions to access each other's settings. In some cases, a second application accessing a first application's settings may do so maliciously, attacking the user by changing (and, in some cases, removing) the settings associated the first application. This can result in the functionality, utility, and security of the first application being reduced by the manipulation of the second application. For example, the second application may now gain access to private and/or personal information on the computing device. In another example, changing (or removing) the settings associated with the first application may render the first application unusable. For example, changing (or removing) the settings associated with the first application may degrade the performance of the first application, the stability of the first application, and/or the user experience with first application. In another example, when the application is used to access remote services and content, the user may be redirected from their chosen service or content provider to one chosen by the second application.

In order to prevent one application from accessing/changing/removing or otherwise tampering with the settings of another application, the settings (preferences) can be protected by a front-end of the application that is included on a server and that executes/runs on the server. The server can include a trusted and protected version of the settings and preferences for the user. The front-end of the application can allow user authentication by the application to occur before the user is allowed to gain any access to the settings. The protection of the settings by the front-end of the application may be beneficial in cases where multiple applications may have similar (or the same) operating system access permissions. In these cases, the multiple applications may have similar (or the same) access permissions to the settings for each of the multiple applications. The front-end of the application can use the server (or other servers accessible by the front-end of the application) to first authenticate the user before allowing subsequent access to the settings for the user. The settings for the application that are associated with the user can be signed using a private, secret key. For example, the private key can be stored on the server and can be associated with the user of the computing device. For example, the private key can be associated with the proprietor of the server(s).

In some implementations, an application can be authenticated to access and interpret previously stored settings. The authentication can involve first authenticating a user of the application (e.g., verifying the user's credentials by using a server remote from the computing device). The application can retrieve the settings that are stored on the remote server. In some cases, the settings are stored encrypted with a symmetric private key that is associated with the settings and the authenticated user (the settings are signed). In some cases, the settings are stored encrypted with the public key of an asymmetric public/private key pair. In some cases, the settings are cryptographically signed when provided to the application. Next, the application can access a public key, where the public key can be embedded in the application stored on a server. Using the public key, the application can validate the signature on a setting before accepting a value for the setting that has been retrieved from the server.

In some implementations, once the application is authenticated to access and interpret previously stored settings, when a user updates or otherwise modifies any of the settings by way of the front-end of the application, the updated and/or modified settings are then stored back on the server. In some implementations, a version of the update and/or modification that is signed using the private key, where the signature is specific to the user, is stored back on the server.

In some cases, a user may interact with a settings user interface. The user can change the settings by reviewing an existing value for a setting, and then explicitly changing the value. In some cases, a user can modify a setting (a preference) without reviewing an existing value for the setting. For example, a user may select a document that includes settings (preferences) that can be loaded when the user starts a computing device of the user. In this example, a user may not interact with a settings user interface. The user may select the loaded document using a contextual menu to add it to a list of documents to load on startup. In other cases, settings can be managed automatically or heuristically on behalf of the user. For example, an application may infer documents and/or collaborators favored for use by the user. The application can record data indicative of the favored documents and/or collaborators as settings that can be automatically presented to the user (e.g., in a quick picker). The settings can be initialized and can further evolve without explicit control by the user. In some cases, if the user chooses to do so, the user may review and modify the inferred value for the settings.

Therefore, the application accepts only signed settings, and only signed settings where a public key bundled with the application can verify the signature. Unsigned settings and settings whose signature cannot be verified will not be accepted as trusted settings for the application. The application will deny access to and/or refuse the settings. This can prevent an application that is not authenticated (the user has not been authenticated to use the application) from making malicious changes to settings for another application that is associated with the settings.

Creating and authenticating trusted settings involves the use of asymmetric cryptography (public-key cryptography). Two separate keys are involved in asymmetric cryptography—a public key and a private (or secret) key. As described, the server uses a private key that is associated with an authenticated user of an application to sign or create a digital signature for the settings, where the settings can be stored in a database remote from a computing device and accessible by the server. In some implementations, a provider of an application can maintain the private key. The application can use a public key, known by the application, accessible to the application, or bundled with the application to verify the signed settings (verify the digital signature).

In implementations where a provider of an application maintains a private key, a unique user identifier can be incorporated in signature creation and verification to prevent an attacker from attempting to legitimately create a user. The attacker could attempt to create a user with the desired settings, ask the application provider to produce a signed copy of the settings, and then transfer the signed settings to a computing device of the user.

Asymmetric cryptography involves the use of the different keys (a private key and a public key) for opposite, inverse functions (encrypting (signing) and decrypting (verifying)). The provider of the application can generate a public and private key pair for the settings. The use of a public and private key pair for asymmetric cryptography can result in computations that can be relatively easy for the application to perform when verifying the settings yet nearly impossible (computationally infeasible) for another application to perform.

FIG. 1 is a diagram that illustrates an example system 100 to authenticate a user, and sign and provide signed settings for the user. The example system 100 includes a computing device 102. The example computing device 102 can include one or more processors (e.g., client central processing unit (CPU) 104) and one or more memory devices (e.g., client memory 106)). The computing device 102 can execute a client operating system (O/S) 108 and one or more client applications (e.g., a web browser application 110) that can display a user interface (UI) (e.g., web browser UI 112) on a display device 120 included in the computing device 102. In addition or in the alternative, the computing device 102 can execute one or more web-based (web-hosted) applications that can display a UI (e.g., web browser UI 112) on the display device 120 included in the computing device 102. In addition, or in the alternative, the computing device 102 can execute one or more client applications (e.g., a web browser application 110) that can include a front-end application 164 that can execute on a server. The front-end application 164 of the client application can display a UI within the client application (e.g., a UI within a web browser application 110) on the display device 120 included in the computing device 102.

The system 100 includes a computer system 130 that can include one or more computing devices (e.g., server 142*a*) and one or more computer-readable storage devices (e.g., database 142*b*). The server 142*a* can include one or more processors (e.g., server CPU 132), and one or more memory devices (e.g., server memory 134). The computing device 102 can communicate with the computer system 130 (and the computer system 130 can communicate with the computing device 102) using a network 116. The server 142*a* can execute a server O/S 136, and one or more server applications 138.

The database 142*b* can include (store, serve as a repository for) settings/preferences files 150 for one or more users. The database 142*b* can include (store, serve as a repository for) one or more private keys 152, where a private key 152 can be associated with a settings/preferences file for a user. The private key 152 can also be associated with a proprietor of the computer system 130. The database 142*b* can include (store, serve as a repository for) a public key 158. The public key 158 can be embedded in (bundled with) a server application 138 (e.g., a server-based web browser application). The database 142*b* can include (store, serve as a repository for) user data 162. An authentication module 160 can access and use the user data 162 to authenticate a user. The authentication can then allow a web browser application executing on the computing device 102 to access the settings/preferences file associated with the authenticated user.

In some implementations, a unique public/private key pair can be associated with each user setting or preference. In some implementations, a unique public/private key pair can be associated with each user. In some implementations, a unique public/private key pair can be associated with a computing device. In some implementations, there is a single public/private key pair, all users share the same public key and additional information is included in a signed response from the server that indicates that the provided value for the setting should be trusted by the user.

In some implementations, the web browser application 110 can include or be associated with one or more web applications (e.g., web application 128). The web application 128 can be executed/interpreted by the web browser application 110. The web application 128 executed by the web browser application 110 can include code written in a scripting language, such as, JavaScript, VBScript, ActionScript, or other scripting languages. In some implementations, the front-end application 164 can be considered a web application 128.

In some implementations, the computing device 102 can be a laptop or a desktop computer, a smartphone, a personal digital assistant, a portable media player, a tablet computer, or other appropriate computing device that can communicate, using the network 116, with other computing devices or computer systems. In some implementations, the computing device 102 can perform client-side operations, as discussed in further detail herein. In some implementations, the computer system 130 can represent more than one computing device working together to perform server-side operations. In a non-limiting example, one computing device may include the applications 138 and another computing device can include the signature generator 154, the operations observer/analyzer 156, and the authentication module 160.

In some implementations, the network 116 can be a public communications network (e.g., the Internet, cellular data network, dialup modems over a telephone network) or a private communications network (e.g., private LAN, leased lines). In some implementations, the computing device 102 can communicate with the network 116 using one or more high-speed wired and/or wireless communications protocols (e.g., 802.11 variations, WiFi, Bluetooth, Transmission Control Protocol/Internet Protocol (TCP/IP), Ethernet, IEEE 802.3, etc.).

A web application may be configured to perform a single task or multiple tasks for a user. In such an implementation, the web application may be configured to be executed or interpreted by the web browser. This is compared with the native applications (e.g., native application 144) that include machine executable code and are configured to be executed directly via the operating system of the client device, whereas, a web application may be incapable of execution or display without the aid of the web browser. Thus, web applications can be run inside a browser with a dedicated user interface, and typically provide functionality and an experience that is more rich and interactive than a standalone website but are less cumbersome and monolithic than a native application 144. Examples of web applications include, but are not limited to, games, photo editors, and video players that can run inside the web browser application 110. The web application 128 can provide a dedicated UI for display on the display device 120. In some implementations, the front-end application 164 can be a web application 128.

In some implementations, the computing device 102 can run, or cause the operating system 108 to execute, the web browser application 110. The web browser application 110 can then provide, in the web browser UI 112, a plurality of panes or tabs 114*a-c*. The web browser UI 112 can be a visual area, usually rectangular, containing some kind of user interface. In a graphical user interface (GUI) used in the computing device 102, the web browser UI 112 can be a two-dimensional object arranged on a plane of the GUI known as a desktop. The web browser UI 112 can include other graphical objects that may be called the "chrome" of the web browser, e.g., a menu-bar, toolbars, controls, icons. The web browser UI 112 can display the graphical objects on the display device 120. A user of the computing device 102 can interact with the graphical objects to provide input to, or otherwise control the operation of, the web browser application 110. Examples of the "chrome" of a web browser will be described herein with reference to FIGS. 2A-B, 3A-C, and 4.

The web browser UI 112 can include a working area in which a document, an image, folder contents, or other objects including information or data for the web application 128 can be displayed. An example of this is shown in FIGS. 2A-B, 3A-C, and 4. The working area can include one main object (e.g., a single web document interface) or multiple objects (e.g., more than one web document interface), where each object can be displayed in a separate window (or tab). Each tab can include a UI. In some applications, specifically web browser applications, multiple documents can be displayed in the individual tabs 114*a-c*. The tabs 114*a-c* are typically displayed one at a time, and are selectable using a tab-bar, which often resides above the contents of an individual window.

In some implementations, the web browser application 110 can be a server-based web browser application. In some implementations, the one or more server applications 138 can include the server-based web browser application. The computing device 102 can run the server-based web browser application that can display a UI (e.g., web browser UI 112) on the display device 120 included in the computing device 102.

In some implementations, the web browser application 110 can be a native application 144 configured to be executed directly by the operating system (e.g., the O/S 108) of a client device (e.g., the computing device 102).

The server 142*a* can include a signature generator 154 and an operations observer/analyzer 156. In some implementations, the signature generator 154 can sign (provide a digital signature for) each of the settings (preferences) for a user before storing the setting in a settings/preferences file for the user that is included with the stored settings/preferences files 150. In some implementations, the signature generator 154 can sign a setting (preference) associated with a user when providing the requested setting to the front-end application 164 associated with the web browser application 110. In some implementations, the signature generator 154 may sign user associated data. For example, the signature generator 154 may sign one or more of a name associated with a setting or preference, a hostname (e.g., a name associated with a server or computing system that can host an application), and an application profile. Signing user associated data can prevent a legitimate, signed value from one setting or preference from being replayed (or reused) in a counterfeit location.

The operations observer/analyzer 156 can monitor (observe) accesses by an authenticated user of the web browser application 110. The monitoring can include which settings/preferences are accessed, how often they are accessed, how often they are modified, and what the modifications are. The operations observer/analyzer 156 can use (analyze) the gathered statistical information to identify any suspicious behavior. For example, frequent changing of a default web page for the web browser application when launched could indicate malicious behavior. In another example, changing the default web page for the web browser application when launched to a known malicious web site can also be indicative of malicious behavior. Once identified, for example, the front-end application 164 may further query and/or request additional authentication of the user and additional confirmation by the user before proceeding to access and modify the settings/preferences for the user.

In some implementations, for a signed in, authenticated user, protected preferences for settings can be modified or edited using the front-end application 164. The front-end application 164 can be rendered as part of a settings page for the web browser application 110, (e.g., the web browser UI 112). A user can interact with the settings page modifying and/or editing one or more preferences for respective one or more settings. A message can provide the changes and updates to the preferences for the settings from the front-end application 164 to the web browser application 210. The modified or updated value for the preference included in the message is accompanied by a signature generated using the private key 152. The signature can be specific to the authenticated user. The web browser application 110 can include/be bundled with a public key used to validate the signature before the web browser application 110 accepts accepting the new/updated value for the preference. Once accepted, the new/updated value for the preference can be displayed on the settings page.

In some implementations, the front-end application 164 can be a web page hosted by the web browser application 110 and controlled by the proprietor of the computing system 130. In some implementations, the front-end application 164 can provide the web browser UI 112 with a back end that accesses the server 142*a* when storing/retrieving/manipulating one or more preferences for user settings. The user interfaces for a settings page can be HyperText Markup Language (HTML) generated by the server 142*a* (e.g., by an application included in the applications 138). When a user interacts with the settings page, standard HTML is sent to the server 142*a*. The server 142*a* interprets the HTML. The result of the user interaction with the settings page changes/modifies one or more settings/preferences for the user that are stored in the database 142*b* (e.g., the settings/preferences files 150) on the server 142*a* for the user.

In some implementations, a copy of the settings/preferences file for the user that is included in the settings/preferences files 150 can be locally stored (stored on the computing device). Periodically (or when updated or modified), the local copy of the settings/preferences file for the user that is included in the settings/preferences files 150 can be updated/overwritten with the copy of the settings/preferences file for the user that is included in the settings/preferences files 150.

In some implementations, when the web browser application 110 launches (starts), the web browser application 110 can read assigned preferences from the settings/preferences file for the user that is included in the settings/preferences files 150. The web browser application 110 can put a copy of the settings/preferences file for the user into local memory (e.g., memory 106 included in the computing device 102) in an unsigned state. The copy of the unsigned settings/preferences included in the settings/preferences file for the user can be placed in the memory 106 once the settings/preferences have been verified. The web browser application 110 can use the verified locally stored settings/preferences. The web browser application 110 can trust the locally stored settings/preferences for use by the web browser application.

In some implementations, when the web browser application 110 launches (starts), the web browser application 110 can read assigned preferences from the settings/preferences file for the user that is included in the settings/preferences files 150. The web browser application 110 can put a copy of the settings/preferences file for the user into local memory (e.g., memory 106 included in the computing device 102) in a signed state. The copy of the signed settings/preferences included in the settings/preferences file for the user can be placed in the memory 106. The web browser application 110 can verify a locally stored setting/preference. The web browser application 110 can verify the locally stored setting/preference for use by the web browser application 110 when the web browser application 110 accesses the setting/preference in the settings/preferences file for the user.

In some implementations, when the web browser application 110 launches (starts), the web browser application 110 can read assigned preferences from the settings/preferences file for the user that is included in the settings/preferences files 150. The web browser application 110 can put a copy of the settings/preferences file for the user into trusted local memory (trusted memory included in the computing device 102). The web browser application 110 can access a setting/preference in the settings/preferences file for the user that is stored in the trusted memory. In these implementations, the copy of the settings/preferences file for the user can be in a signed or an unsigned state.

FIGS. 2A-B are diagrams that illustrate example user interfaces (user interface 200 and user interface 250, respectively) for signing into a web browser application.

In FIG. 2A, the user interface 200 presents a sign in page (a sign in web page) where a user can enter credentials in provided fields (e.g., a username field 202 and a password field 204), where the credentials are associated with the user for authentication of the user for further use of various functions of the application. In the example of FIG. 2A (and referring to FIG. 1), the user interface 200 is presented in the UI (e.g., web browser UI 212) of a web browser application (e.g., web browser application 210) running on a computing device (e.g., computing device 102). For example, the web browser application 210 can receive the user credentials (e.g., a username entered in the field 202 and a password entered in the password field 204). The web browser application 210 can authenticate the user, based on the user credentials, for use of a front-end application (e.g., the front-end application 164) included as part of the web browser application 210 that can execute on a server (e.g., server 142a) remote from the computing device. In some implementations, the web browser application 210 may be running locally on the computing device and the front-end application (e.g., front-end application 164) can run remotely on the server.

As an example, referring to FIG. 1, the server 142a can authenticate the user using the authentication module 160 and the credentials (e.g., the username entered in the username field 202 and the password entered in the password field 204) stored for/associated with the user in the user data 162 included in the database 142b.

In FIG. 2B, the user interface 250 presents a confirmation page 206 informing the user that they have been authenticated for use of other functions of the web browser application 210. In the example of FIG. 2A (and referring to FIG. 1), the user interface 250 is presented in the UI (e.g., web browser UI 212) of the web browser application (e.g., web browser application 210) running on the computing device (e.g., computing device 102). For example, referring to FIG. 1, the server 142 has authenticated the user. As a result of the user authentication, the web browser application (e.g., web browser application 210) can launch a front-end application (e.g., front-end application 164) associated with the web browser application 210. The front-end application 164 can synchronize settings/preferences for the user with user data for the user that is associated with an account for the user. The synchronized settings/preferences can be stored in a settings/preferences file for the user that is included in the stored the settings/preferences files 150 in the database 142b. The data for the user can be included/stored in association with the user (in an account for the user) included in the user data 162 in the database 142b. The synchronization can allow other applications associated with the user's account and provided by the same proprietor to use/share the settings/preferences for the user that are stored in a settings/preferences file for the user that is included in the settings/preferences files 150 in the database 142b.

Figure 3B:
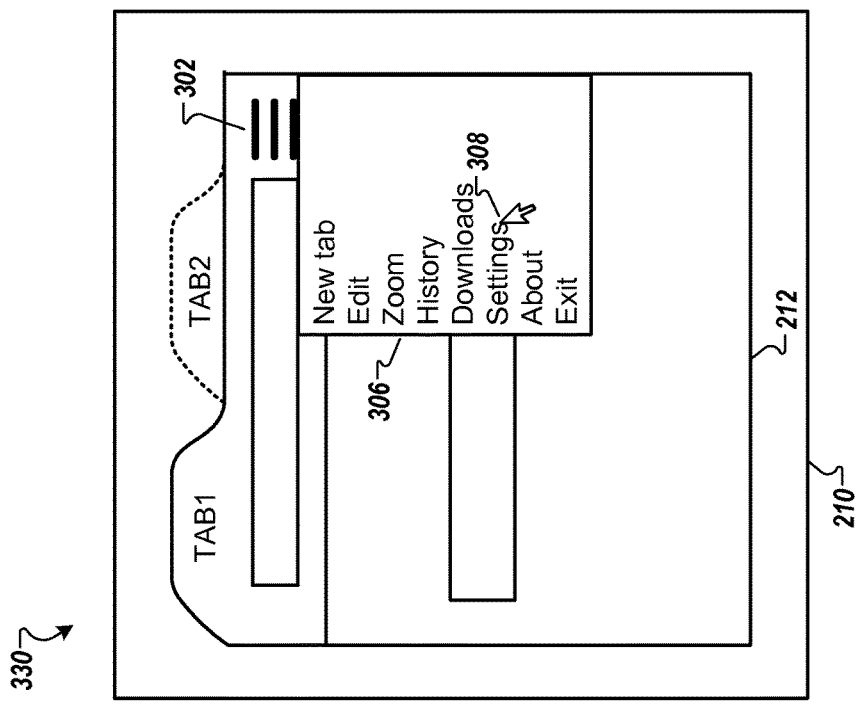
FIGS. 3A-C are diagrams that illustrate example user interfaces for gaining access to settings and preferences for a user.
Figure 3A:
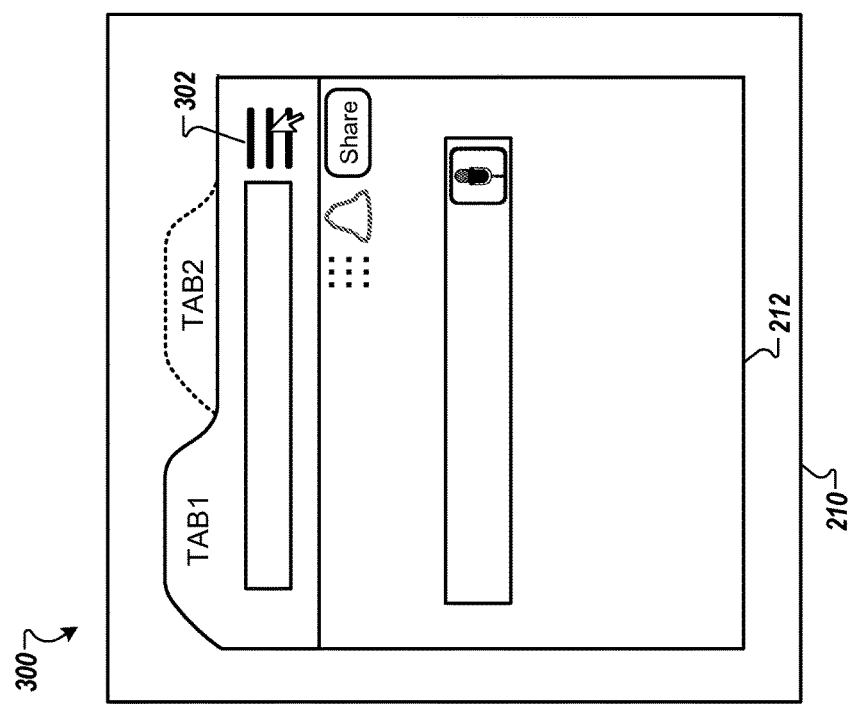
Figure 3C:
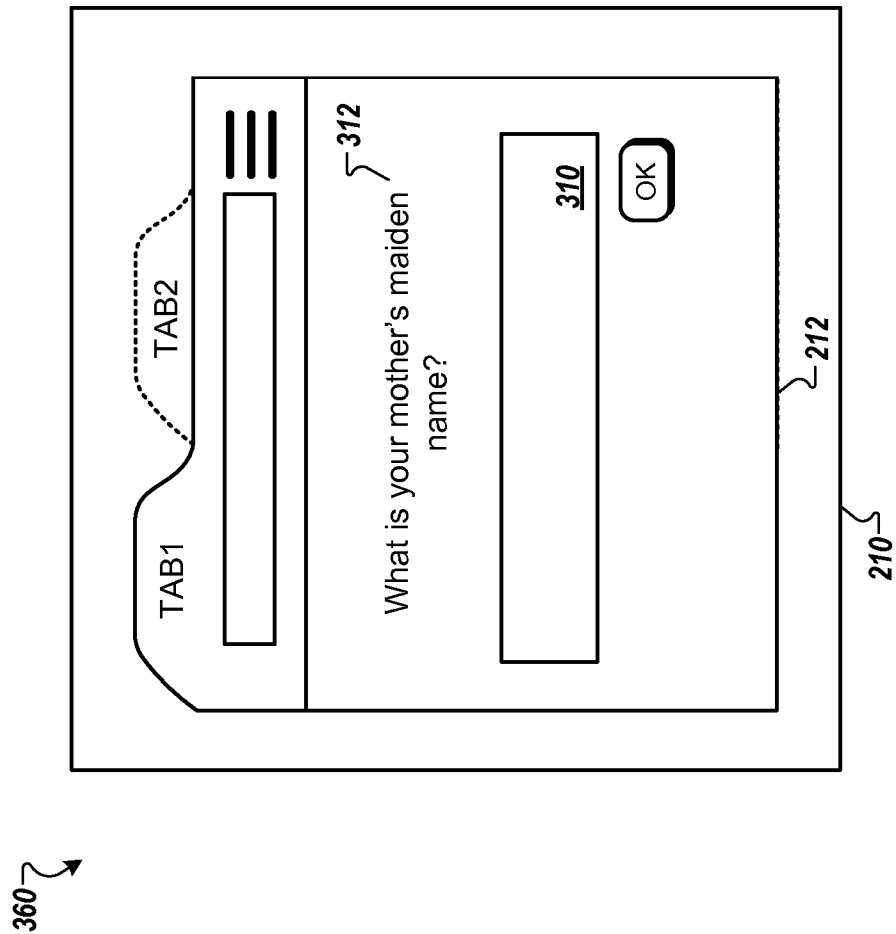

FIGS. 3A-C are diagrams that illustrate example user interfaces 300, 330, 360, respectively, for gaining access to settings/preferences for a user of an application.

FIG. 3A is a diagram that illustrates an example user interface 300 for a web browser application. In the example of FIG. 3A (and referring to FIGS. 1 and 2A-B), the user interface 300 is presented in the UI (e.g., web browser UI 212) of the web browser application (e.g., web browser application 210) running on the computing device (e.g., computing device 102). The web browser application 210 can receive a selection of a customization icon 302. In response, the web browser application 210 can provide a drop down customization menu 306 as shown in the user interface 330 in FIG. 3B. The web browser application 210 can receive the selection of a settings choice 308. In response, the web browser application 210 can display a settings menu 402 (a settings page 402), as shown in a user interface 400 in FIG. 4.

In some implementations, in response to receiving the selection of the settings choice 308, the web browser application 210 can present the user interface 360. The user interface 360 can include a request for additional credentials in a UI (e.g., web browser UI 212) of the web browser application (e.g., web browser application 210). The web browser application 210 can receive the additional credentials and can further authenticate the user for use of the front-end application (e.g., front-end application 164) included as part of the web browser application 210 and that can execute on a server (e.g., server 142a) remote from the computing device 102.

In some implementations, the web browser application 210 may not authenticate a user prior to receiving the selection of the settings choice 308. In these implementations, the web browser application 210 may provide the user interface 200, as shown in FIG. 2A, to a user in response to receiving the selection of the settings choice 308. As described with reference to FIGS. 2A-B, the web browser application 210 may then receive the user credentials and further authenticate the user. In response to the further authentication of the user, the web browser application 210 can display the settings menu 402, as shown in the user interface 400 in FIG. 4.

Figure 4:
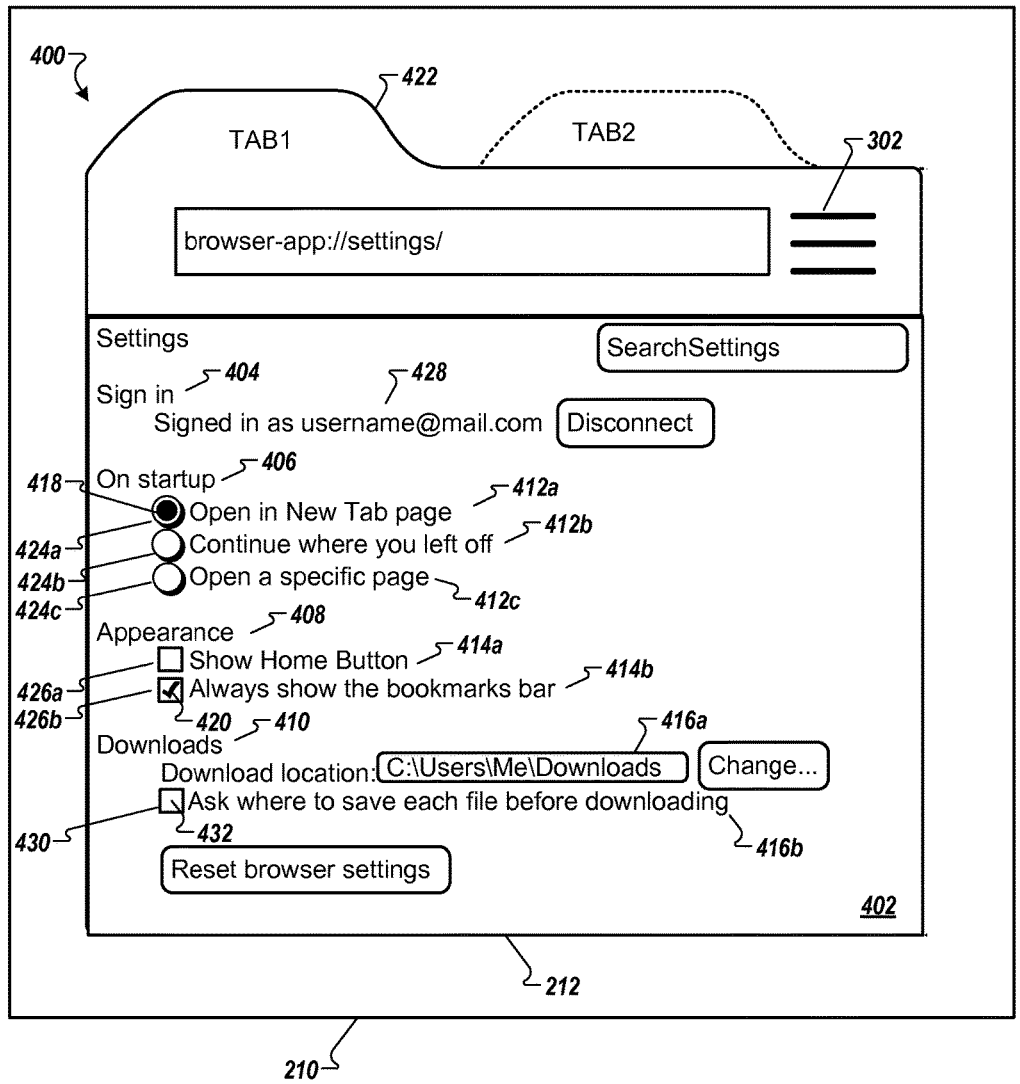
FIG. 4 is a diagram that illustrates an example user interface for accessing/viewing/modifying settings/preferences for an authenticated user.

FIG. 4 is a diagram that illustrates an example user interface 400 for accessing (viewing/modifying) settings/preferences for an authenticated user. As described with reference to FIGS. 1, 2A-B, and 3A-C, the web browser application 210 can display the settings menu 402, as shown in the user interface 400, on the display device 120 of the computing device 102. In some implementations, the web browser application 210 can display the settings menu 402 responsive to the selection of the settings choice 308 and for an authenticated user. As shown in FIG. 4, a sign in setting 404 includes an identifier 428 indicative of the signed-in authenticated user.

The web browser application 210 can use a front-end of the web browser application (e.g., front-end application 164) to display the settings menu 402 and to provide output to and receive input from the settings menu 402. The front-end application 164 can execute in a tab 422 of the web browser application 210. A server (e.g., the server 142a) can run the front-end application 164 remote from the application running on the computing device 102. The front-end application 164 can communicate with/interface to the server 142a and the web browser application 210. The front-end application 164 can provide authenticated settings/preferences, obtained/retrieved from a settings/preferences file for the user that is stored in the settings/preferences files 150 included in the database 142b, to the settings menu 402. The front-end application 164 can accept input provided by an authenticated user of the settings menu 402 to further store in the settings/preferences file for the user included in the settings/preferences files 150 included in the database 142b.

For example, referring to FIG. 4, the settings menu 402 can display settings 406, 408, and 410. The settings menu 402 can display preferences 412*a-c* for on startup setting 406, preferences 414*a-b* for an appearance setting 408, and preferences 416*a-b* for a downloads setting 410. The front-end application 164 can access the settings/preferences file associated with the user and included in the settings/preferences files 150 to provide output to the settings menu 402 indicative of the stored preferences for the settings 406, 408 and 410 for the authenticated user.

The front-end application 164 can retrieve the stored settings/preferences for the user from the settings/preferences files 150. If the retrieved settings/preferences are not already signed, the front-end application 164 can sign each setting/preference for the user with a private key 152 associated with the user. The private key 152 can create a digital signature for the setting/preference. The front-end application 164 can provide each signed setting/preference for the user to the web browser application 210, which can use the public key 158 to validate each signed setting/preference for the user. As described, the public key 158 can be associated with/bundled with the web browser application 210 and can be used to verify the digital signature for the setting/preference.

Once a setting/preference for the user is validated, the front-end application can display on the settings menu 402 an indication of the current preference for the setting. For example, the front-end application 164 can display indicator 418 in the settings menu 402 indicating that the current user preference for the on startup setting 406 is "open in new tab page". Similarly, the front-end application 164 can display indicator 420 in the settings menu 402 indicating that the current user preference 412*b* for the appearance setting is "always show the bookmarks bar." The front-end application 164 can populate a download location field 416*a* with signed information obtained/retrieved from the settings/preferences file for the user that is included in the settings/preferences files 150. The signed information can then be validated by the front-end application 164.

In some implementations, the front-end application 164 can receive selections of radio buttons (e.g., radio buttons 424*a-c*) and check boxes (e.g., check boxes 426*a-b*). The selection of a radio button and/or a check box can indicate a selection of a preference for a setting. In some cases, the front-end application 164 can receive input in an input field (e.g., download location field 416*a*) indicative of a preference (e.g., a location) for a setting (e.g., downloads setting 410).

When an authenticated user makes a change to a value for a preference for a setting (e.g., selects a radio button, deselect a radio button, selects a check box, deselects a checkbox, enters information in an input field), the new value is sent to/uploaded to the server (e.g., server 142*a*). The server 142*a* can save/store the value in the settings/preferences file associated with the user and included in the settings/preferences files 150. In some implementations, the server 142*a* can sign/encrypt the value for the preference for the setting using the private key 152 associated with the user. The server 142*a* can then store the signed value for the preference for the setting in the settings/preferences file associated with the user. In some implementations, the server 142*a* can store the value for the preference for the setting, signing the value when the value is request by the front-end application 164 for output and display to the user in the web browser UI 212. The server 142*a* can store the preference for the setting in a settings/preferences file for the user that is included in the settings/preferences file 150 in the database 142*b* along with other settings/preference values associated with the user (the user's account).

Figure 5:
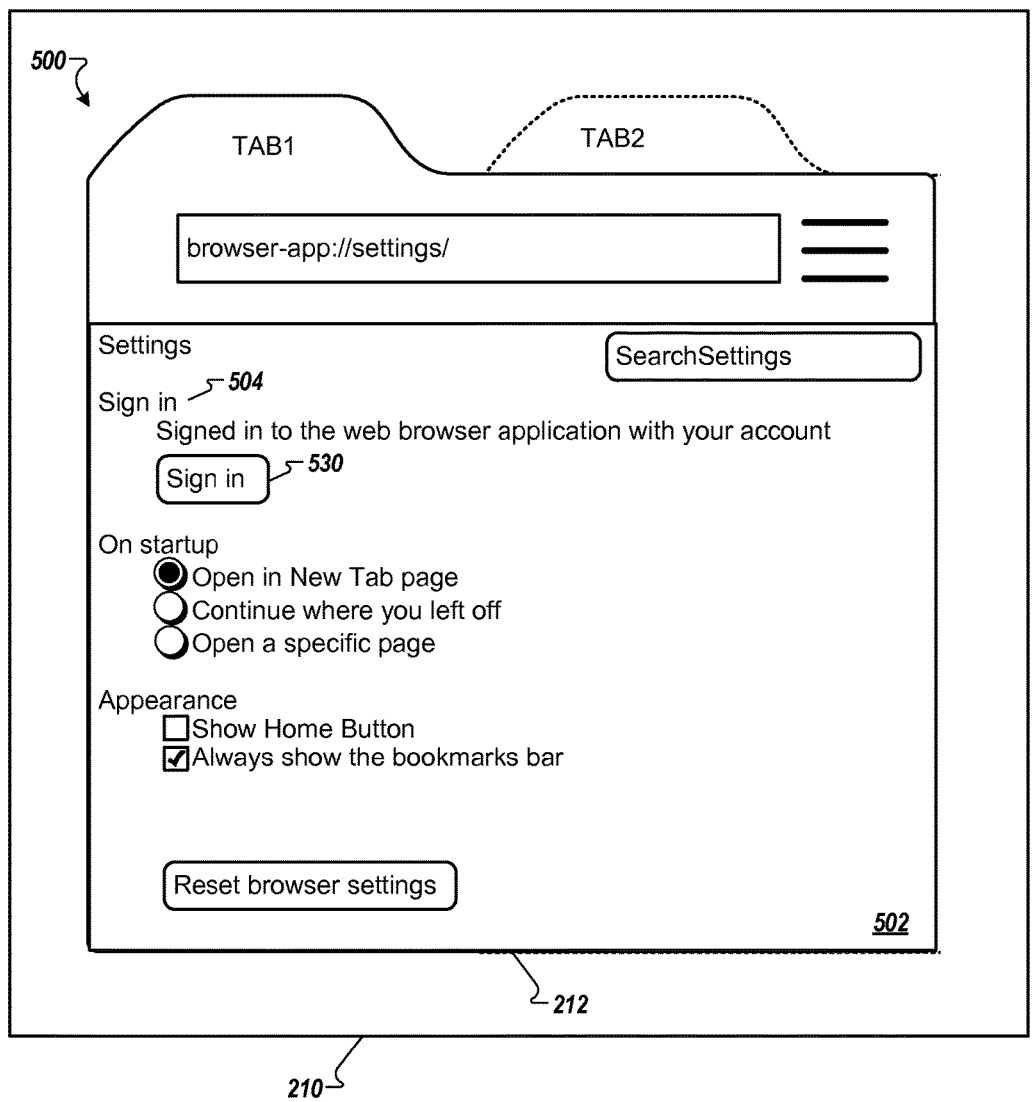
FIG. 5 is a diagram that illustrates an example user interface for accessing/viewing/modifying settings/preferences for an unauthenticated user.

FIG. 5 is a diagram that illustrates an example user interface 500 for accessing/viewing/modifying settings/preferences for an unauthenticated user. In some implementations, a user may not provide authentication information and/or credentials to the web browser application 210. A user may opt not to sign in and can remain unknown to the proprietor of the web browser application 210. Referring to FIGS. 3A-B, the web browser application 210 can receive a selection of the customization icon 302 from the unauthenticated user. In response, the web browser application 210 can provide the drop down customization menu 306 as shown in the user interface 330 in FIG. 3B. The web browser application 210 can receive the selection of a settings choice 308. In response, the web browser application 210 can display a settings menu 502 (a settings page 502), as shown in the user interface 500 in FIG. 5.

In these implementations, the web browser application 210 can provide unauthenticated settings/preferences to the settings menu 502. The unauthenticated settings/preferences can be stored in a settings/preferences file included in the computing device (e.g., the computing device 102 as shown in FIG. 1). For example, referring to FIG. 1, the settings/preferences file can be stored in the memory 106. In addition or in the alternative, the web browser application 210 can receive input provided by the unauthenticated user to further store in the settings/preferences file for the user. In these implementations, however, any unauthenticated user can modify/set/change a user's settings, and in many cases, these changes can occur without the user having any knowledge of the change. In some cases, these settings modifications may be malicious. For example, the web browser may default to a malicious web site when launched.

As shown in FIG. 5, the unauthenticated user may opt to sign in by selecting a sign in button 530. For example, the web browser application can receive an indication of the selection of the sign in button 530. In response, the web browser application can display the user interface 200 as shown in FIG. 2A. The authentication process can then be similar as that described above with reference to FIGS. 2A-B. Once signed in and authenticated, referring now to FIGS. 3A-B, if the web browser application 210 receives the selection of the settings choice 308, the web browser application 210, and specifically the front-end application 164, can display the settings menu 402, as shown in the user interface 400 in FIG. 4. The authenticated user will be provided with selected settings and preferences and can input settings and preferences as described above with reference to FIG. 4.

In some cases, additional user interface affordances can be included in a user interface (e.g., the user interfaces shown in FIGS. 2A-B, 3A-C, 4, and 5) that can inform a user that settings for the user are protected and backed up in the cloud.

Figure 6:
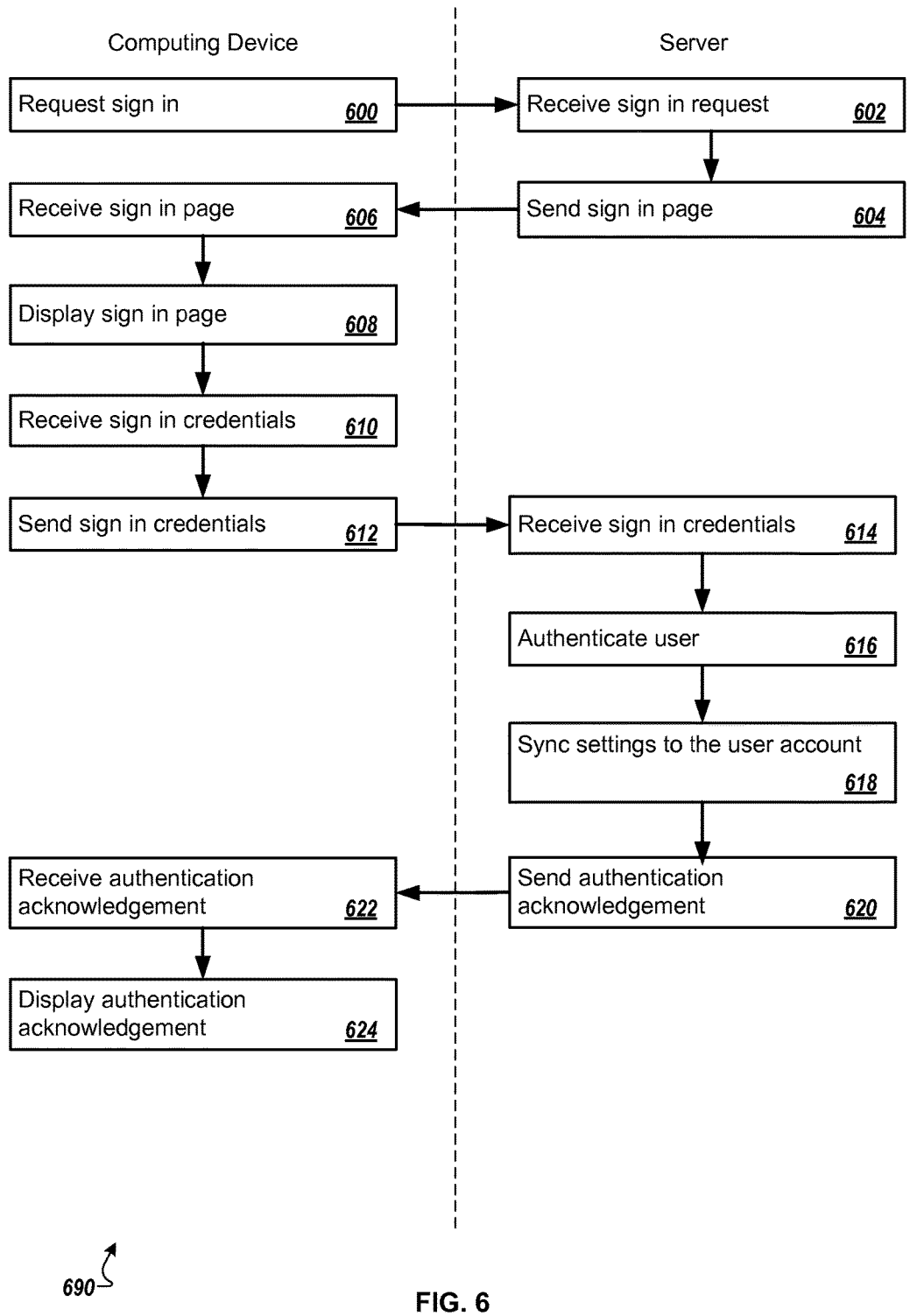
FIG. 6 is a swimlane diagram showing interactions between a computing device and a server when authenticating a user of a web browser application.

FIG. 6 is a swimlane diagram showing interactions 690 between a computing device and a server when authenticating a user of a web browser application. Referring to FIGS. 1 and 2A-B, a computing device (e.g., the computing device 102) can request a sign in web page for a web browser application (e.g., web browser application 110, web browser application 210) (600). A server (e.g., the server 142*a*) receives the request for the sign in web page (602) and provides/sends the sign in web page to the computing device (604). The web browser application receives the sign in web page (606) and displays the sign in web page (608) on a display device included in the computing device. The user interface 200 is an example of a displayed sign in web page in a web browser UI 212 of the web browser application 210. The computing device 102 can display the web browser UI 112 on the display device 120. The computing device can receive sign in credentials entered by a user (610). For example, the web browser application 210 running on the computing device can receive a username and password to use to authenticate a user, the username entered in the username field 202 and the password entered in the password field 204 of the user interface 200.

The computing device sends the received username and password (the user credentials) to the server (612). The server receives the sign in credentials (614) and proceeds to authenticate the user using the received credentials (616). For example, an authentication application (e.g., included in the applications 138) running on the server 142a can access the user data 162 and can determine that the received user credentials are the same as (match) credentials for the user stored in the user data 162. The server can further synchronize settings/preferences stored for the authenticated user with an account for the user (618). For example, the server 142a can synchronize settings/preferences for the user stored in a settings/preferences file associated with the user and included in the settings/preferences files 150. The settings/preferences for the user can be synchronized across multiple applications provided by the proprietor of the web browser application (e.g., applications 138). The server can send an authentication acknowledgement (620) indicating the authentication was successful. The computing device can receive the authentication acknowledgement (622) and display the acknowledgement in a web browser UI of the web browser application (624). For example, the computing device 102 can display the user interface 250 on the display device 120.

Figure 7:
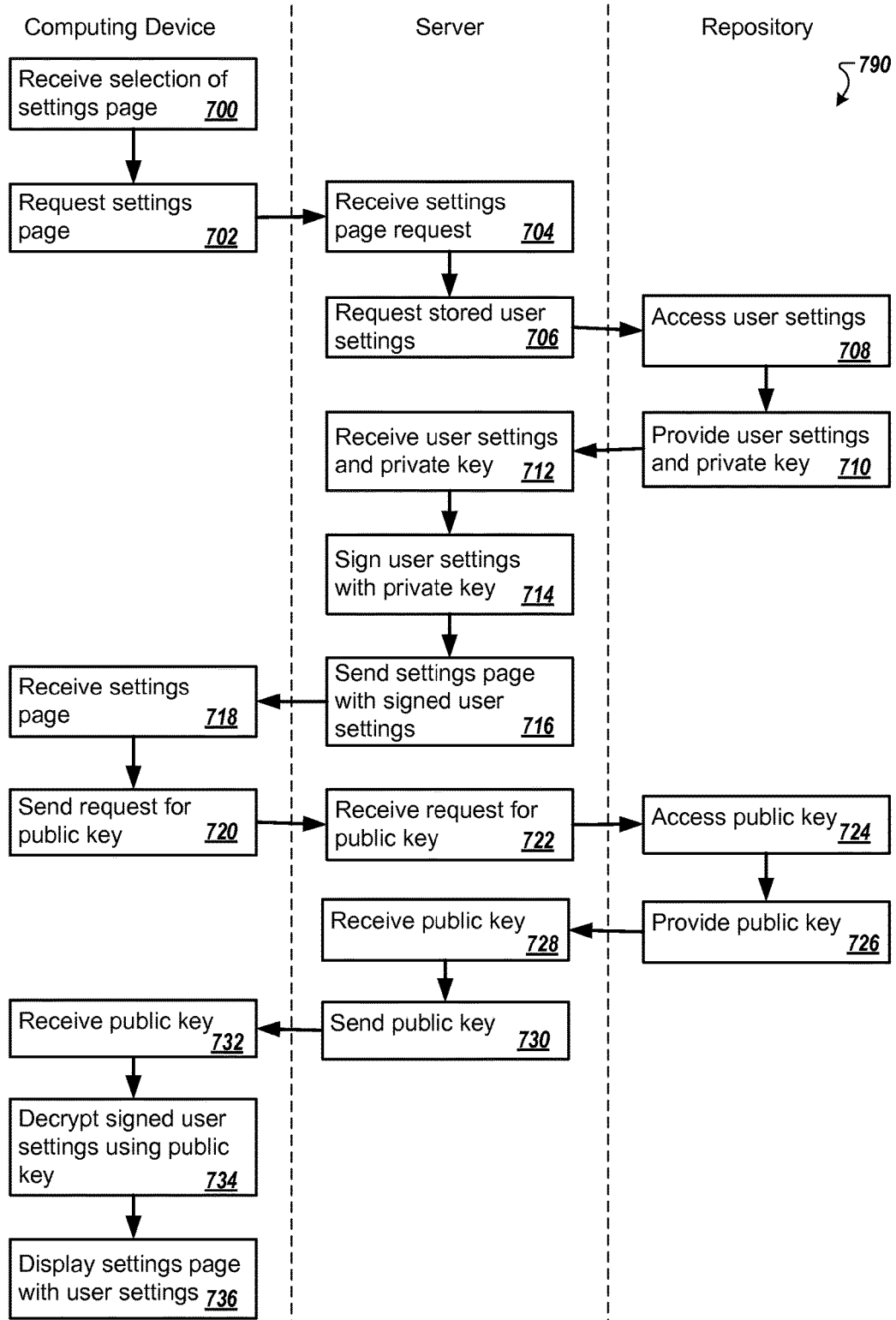
FIG. 7 is a swimlane diagram showing interactions between a computing device, a server, and a repository when displaying settings/preferences for an authenticated user of a computing device.

FIG. 7 is a swimlane diagram showing interactions 790 between a computing device, a server, and a repository when displaying settings/preferences for an authenticated user of a computing device. Referring to FIGS. 1, 2A-B, 3A-B, and 4 a computing device receives an indication of a selection of a settings page (700). For example, at the computing device 102 a web browser application (e.g., the web browser application 210) can receive the selection of the settings choice 308, as shown in FIG. 3B, from an authenticated user of the web browser application 210. The computing device requests a settings page from the server (702). The server receives the request for the settings page (704). For example, a front-end of the web-browser application (front-end application 164) running on the server 142a can receive the request for the settings page. The server requests user settings, stored in association with the user, from a repository (706). For example, the front-end application 164 can access a settings/preferences file for the user included in the settings/preferences files 150 included in the database 142b.

The repository can access the user settings (708) and provide the user settings, and in some implementations, a private key associated with the user to the server (710). For example, the server 142a (e.g., the front-end application 164) can retrieve the settings/preferences file for the user from the settings/preferences files 150 included in the database 142b. In some implementations, the retrieved settings included in the settings/preferences file are signed with a private key associated with the user (include a digital signature). In some implementations, the settings included in the settings/preferences file for the user may not be signed. In these implementations, the server receives the user settings and the private key (712) and then signs the settings with the private key (generates a digital signature) (714). For example, if the user settings are not signed, the server 142a (e.g., the signature generator 154) receives the settings/preferences file for the user from the database 142b. The server 142a (e.g., the signature generator 154) retrieves/accesses the private key 152 stored in the database 142b. The server 142a (e.g., the signature generator 154) uses the private key 152 to sign the settings included in the settings/preferences file for the user. The server sends the settings page including the signed user settings to the computing device (716). The computing device receives the settings page (718). For example, the front-end application 164 can provide the settings menu 402 (settings page 402) to the computing device 102 for authentication and display on the display device 120. The computing device sends a request for a public key to the server (720). The server receives the request for the public key (722) and accesses the repository to obtain the public key (724). The repository provides the public key to the server (726). The server receives the public key (728), and sends the public key to the computing device (730). The computing device receives the public key (732). For example, the web browser application (e.g., the web browser application 210) whose front-end (e.g., front-end application 164) is running on the server (e.g., the server 142a) can request the public key 158 from the database 142b. In some implementations, the public key can be bundled with/embedded in the web browser application. In these implementations, the computing device may not request the public key from the server.

The computing device decrypts the signed user settings using the public key (734). The computing device can validate the signature for each setting included in the received settings page. For example, the web browser application 210 can use a public key (e.g., the public key 158) to validate each signed setting in the settings page. The computing device can display the settings page including the user settings (736) once the user settings are validated. For example, the display device 120 of the computing device 102 can display the settings menu 402. The web browser application 210, using the front-end application 164, validates the indicated values for each setting before the settings are displayed in the settings menu 402.

Figure 8:
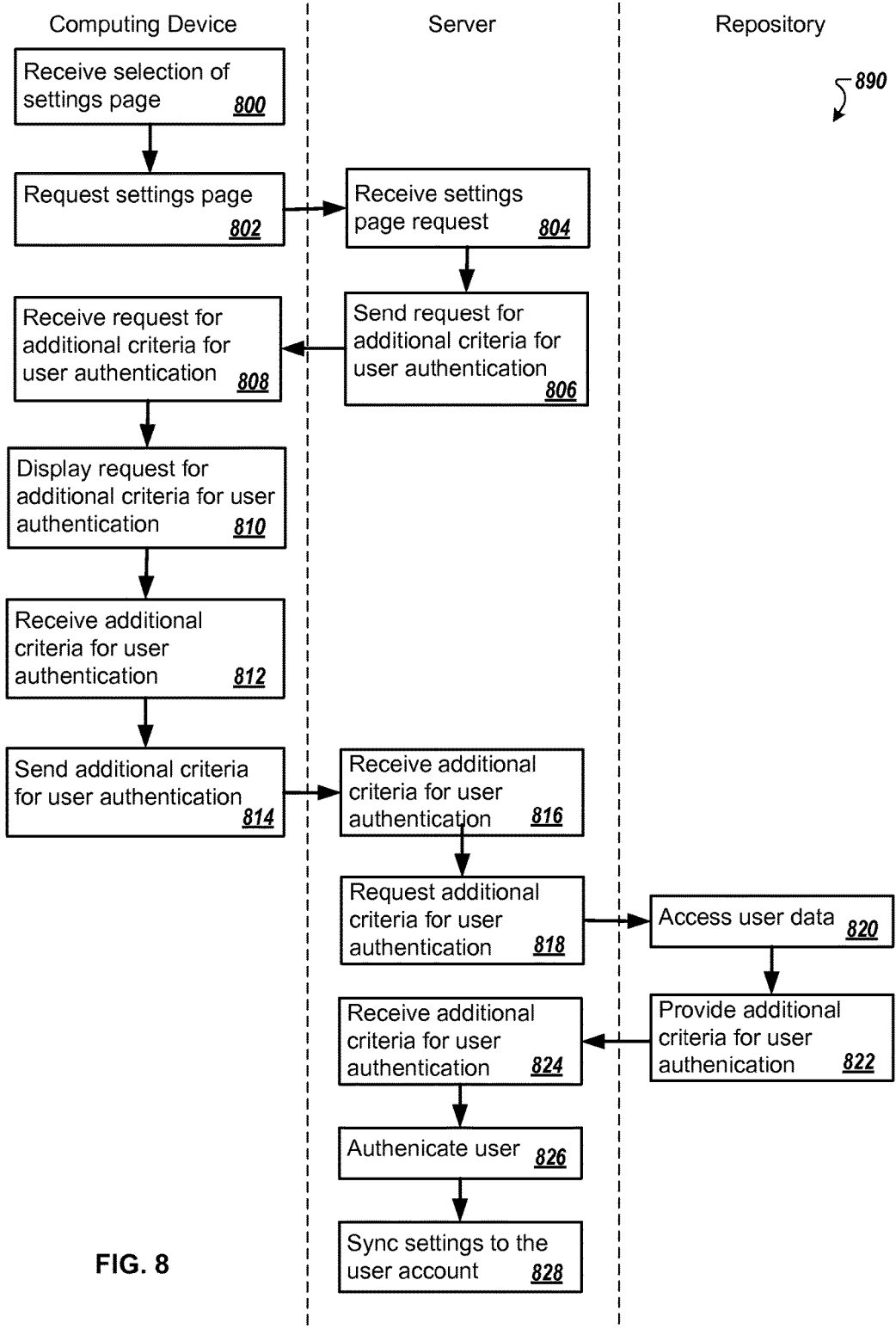
FIG. 8 is a swimlane diagram showing interactions between a computing device, a server, and a repository when displaying the settings/preferences for a user of the computing device, where further user authentication may be required.

FIG. 8 is a swimlane diagram showing interactions 890 between a computing device, a server, and a repository when displaying the settings/preferences for a user of the computing device, where further user authentication may be required. Referring to FIGS. 1, 2A-B, 3A-C, and 4, a computing device receives an indication of a selection of a settings page (800). For example, at the computing device 102 a web browser application (e.g., the web browser application 210) can receive the selection of the settings choice 308, as shown in FIG. 3B, from an authenticated user of the web browser application 210. The computing device requests a settings page from the server (802). The server receives the request for the settings page (804). For example, a front-end of the web-browser application (front-end application 164) running on the server 142a can receive the request for the settings page.

The server sends a request for additional criteria for further user authentication (806). For example, the server 142a (e.g., the front-end application 164) determines that additional information about the user is needed to further authenticate the user before providing the settings page to the user. For example, a user may be signed into the web browser application for an extended time period before requesting access to the settings page. The further user authentication can verify that the same user is still using the computing device. In another example, this may be the first time a user has used the computing device to access the settings page. The additional user authentication can further validate the requested settings page access.

The computing device receives the request for the additional criteria for the further user authentication (808). The computing device displays a user interface requesting the additional criteria for further user authentication (810). The user interface can include at least one user input field and at least one prompt associated with the user input field. The computing device receives the additional criteria for further user authentication (812). The computing device sends the additional criteria for user authentication to the server (814). The server receives the additional criteria for user authentication (816). The server requests additional criteria for authentication of a currently authenticated user from user settings, stored in association with the user, in a repository (818). The repository can access the user data (820) and provide the requested additional criteria for user authentication to the server (822). The server receives the additional user authentication criteria (824).

For example, the server 142*a* (e.g., the front-end application 164) can send a request to the computing device 102 (e.g., the web browser application 210) to display a web browser UI (e.g., the user interface 360 as shown in FIG. 3C). The web browser UI can provide one or more input fields (e.g., an input field 310) for receiving user criteria and at least one prompt (e.g., a prompt 312) associated with each user input field. The prompt displays a hint or question that a user can provide the answer to in the input field. The response to the hint or question can comprise the additional criteria used to authenticate the user. Though not shown in FIG. 3C, other methods for providing prompts and/or receiving additional criteria in response to the prompts can be used to authenticate the user.

The server 142*a* (e.g., the front-end application 164) can receive the additional criteria for the user. The server 142*a* (e.g., the front-end application 164) can request/access/receive user data, which can include additional criteria specified by a user for use in further authenticating the user, from the user data 162 included in the database 142*b*. The server 142*a* (e.g., the front-end application 164) can receive the additional criteria and can use the additional criteria to authenticate the user.

The server can authenticate the user (826). The authentication can determine that the criteria received from the computing device is in agreement with/matches the criteria stored in the repository for the user. For example, the server can determine that the criteria from the computing device and the criteria stored in the user data match or are the same. Once authenticated, the server can synchronize settings/preferences stored for the authenticated user with an account for the user (828). Referring to FIG. 7, the interactions can continue with the server requesting user settings, stored in association with the user, from a repository (706).

Figure 9:
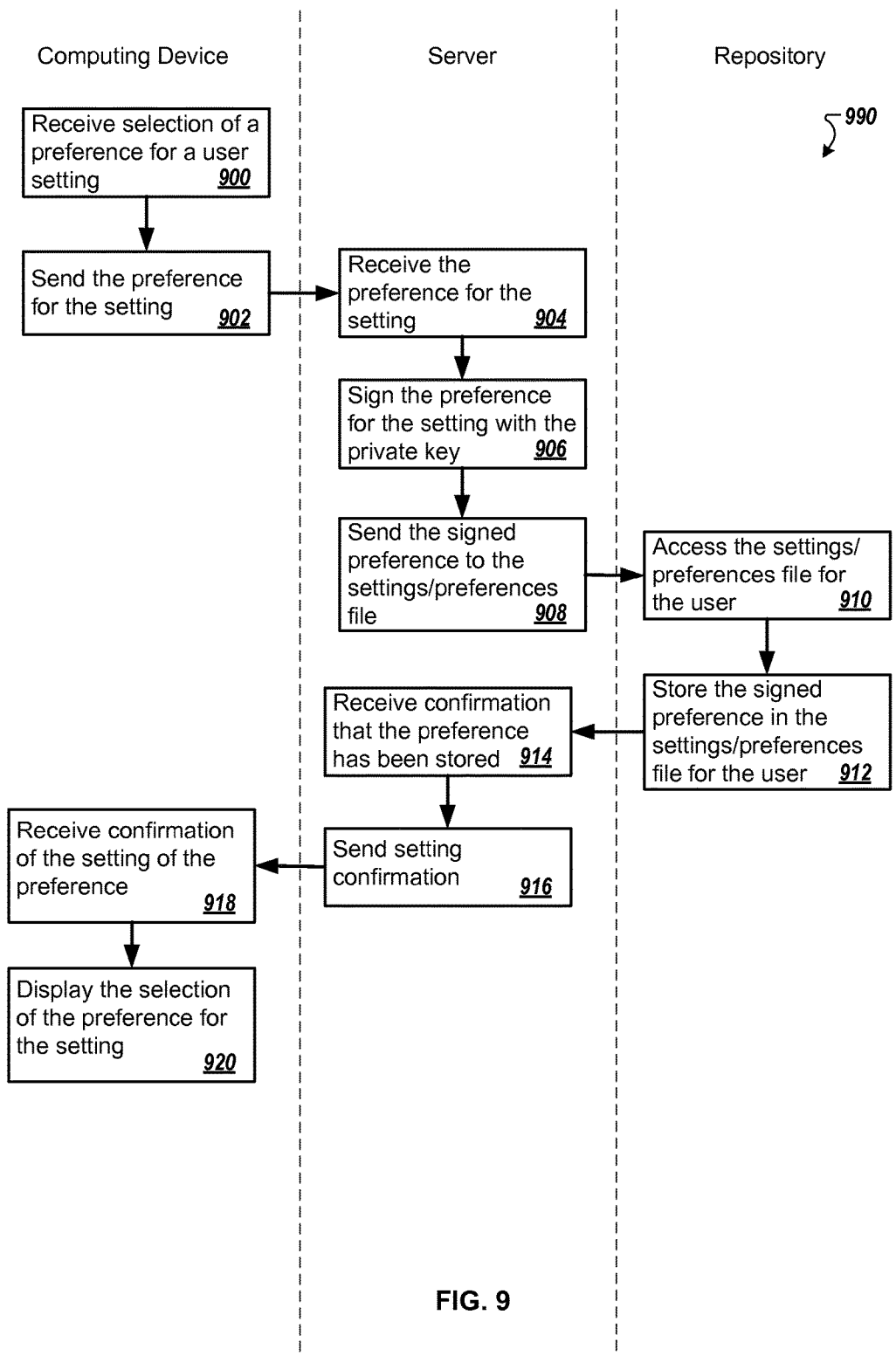
FIG. 9 is a swimlane diagram showing interactions between a computing device, a server, and a repository when updating/modifying a setting/preference for the user.

FIG. 9 is a swimlane diagram showing interactions 990 between a computing device, a server, and a repository when updating/modifying a setting/preference for the user. For example, the interactions 990 can begin for an authenticated user after a settings page is displayed with user settings (736), as shown in the interactions 790 in FIG. 7. For example, referring to FIGS. 1 and 4, the display device 120 of the computing device 102 can display the settings menu 402. The web browser application 210, using the front-end application 164, validates the indicated values for each setting before the settings are displayed in the settings menu 402.

The computing device receives a selection of a preference for a user setting (900). The computing device sends the selected preference for the setting to the server (902). The server receives the selected preference for the setting (904). For example, a user can interact with the settings menu 402, selecting indicator 430 for preference 416*b* ("ask where to save each file before downloading") for the download setting 410. The computing device 102 (e.g., the web browser application 210) receives the selection of the indicator 430 for the preference 416*b* and sends an indication of the selection (the preference for the download setting 410) to the server 142*a* (e.g., the front-end application 164).

The server signs the preference for the setting using a private key associated with the user (906). The server sends the signed preference for the setting to a settings/preferences file associated with the user and included in a repository (908). The repository accesses the settings/preferences file for the user (910) and stores the signed preference in the settings/preferences file associated with the user (912). The server receives confirmation that the signed preference has been stored in the settings/preferences file for the user (914). The server sends confirmation to the computing device indicating the received preference for the setting has been stored in the settings/preferences file associated with the user (916).

For example, the server 142*a* can access/retrieve the private key 152 from the database 142*b*. The signature generator 154 can sign the received preference using the private key 152 (create a digital signature for the preference). The server 142*a* can store the signed preference in the settings/preferences file associated with the user and included in the settings/preferences file 150 included in the database 142*b*. The server 142*a* informs the computing device that the selected preference for the setting (e.g., the selection of the indicator 430 for preference 416*b* for the download setting 410) has been signed and stored in the settings/preferences file for the user.

In some implementations, preferences stored in the settings/preferences file for a user may not be signed. In these implementations, the server may store the preference for the setting in the settings/preferences file for the user unsigned, signing the preference for the setting when providing it to for a settings page.

The computing device receives confirmation of the signing and storing of the preference setting in the settings/preferences file for the user (918). The computing device displays the selection of the preference for the setting (920). For example, the computing device (e.g., the web browser application 210) receives confirmation of the signing and storing of the preference setting. The web browser UI 212 can check (or otherwise enable) a check box 432 indicating the selection of the preference 416*b* for the download setting 410.

Figure 10:
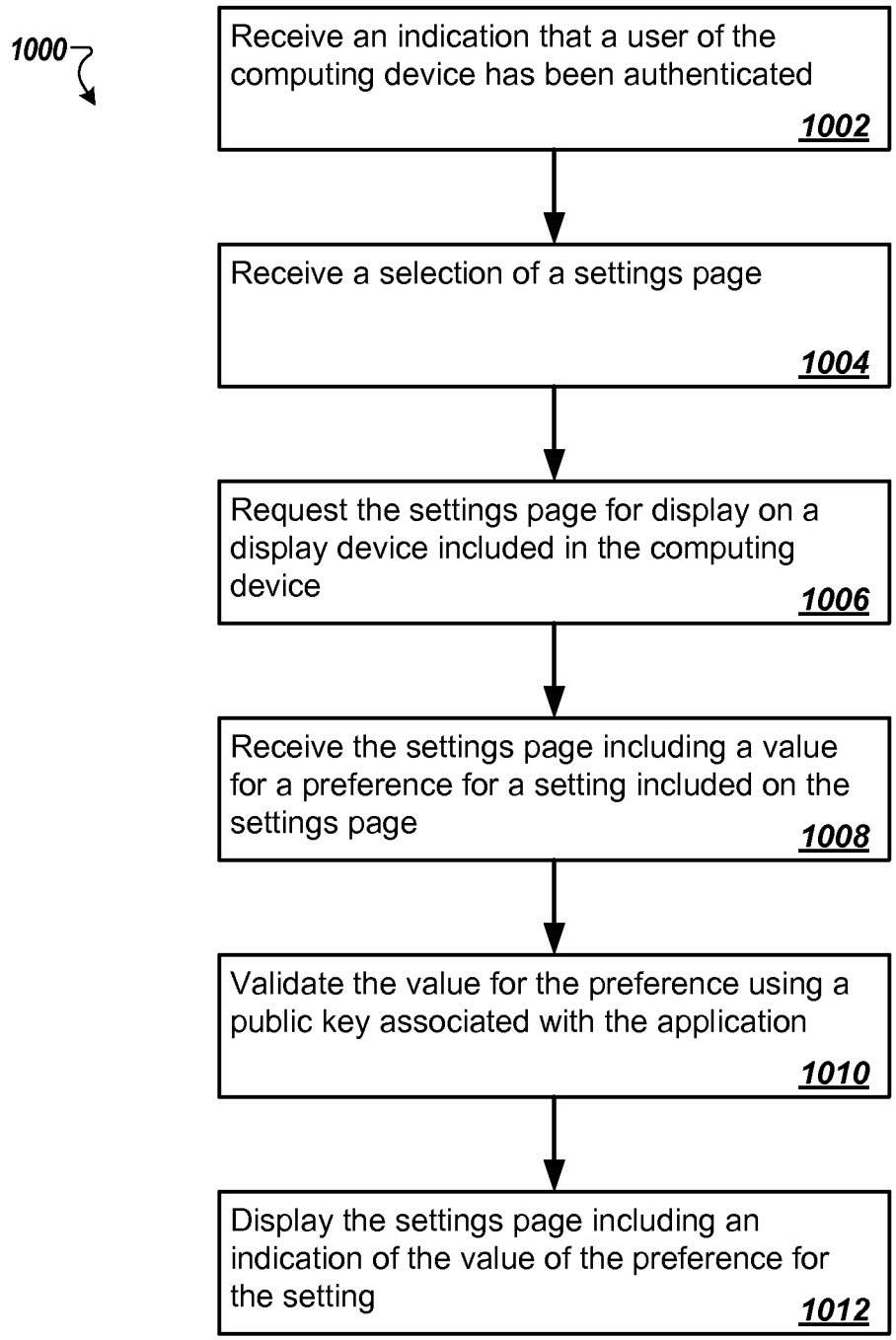
FIG. 10 is a flowchart that illustrates a method for displaying settings/preferences of an authenticated user of an application.

FIG. 10 is a flowchart that illustrates a method 1000 for displaying settings/preferences of an authenticated user of an application. In some implementations, the systems described herein can implement the method 1000. For example, the method 1000 can be described referring to FIGS. 1, 2A-B, 3A-C, 4, and 5.

An indication that a user of the computing device has been authenticated is received (block 1002). For example, the web browser application 210, which can be running (executing) on the computing device 102, can receive the indication. A selection of a settings page is received (block 1004). For example, the web browser application 210 running on the computing device 102, can receive the selection of the settings page (receive the selection of the settings choice 308 for the settings page (settings menu 402)). The settings page (e.g., settings menu 402) can be associated with the application (e.g., the web browser application 210) and the user.

The settings page is requested for display on a display device included in the computing device (block 1006). For example, the web browser application 210 can request the settings page (e.g., the settings menu 402) for display on the display device 120 of the computing device 102 from a front-end of the web browser application (the front-end application 164). The settings page is received and includes a value for a preference for a setting included on the settings page (block 1008). The value for the preference is signed by a private key associated with the user. For example, the computing device 102 receives the settings page (e.g., settings menu 402) rendered by the front-end application 164. The indicator 418 indicates the preference for the on startup setting 406 is "open in new tab page". The front-end application 164 can retrieve the stored settings/preferences for the user from the settings/preferences files 150. If the retrieved settings/preferences are not already signed, the front-end application 164 can sign each setting/preference for the user with a private key 152 associated with the user. The front-end application 164 renders the setting page using the signed preference for the setting.

The value for the preference is validated using a public key associated with the application (block 1010). For example, the web browser application 210 can validate the signed preference for the setting using the public key 158 that can be bundled with/embedded in the web browser application 210. The display device displays the settings page including an indication of the value of the preference for the setting (block 1012). For example, based on the validation, the front-end application 164) renders the settings page for display on the display device 120 of the computing device 102.

Figure 11:
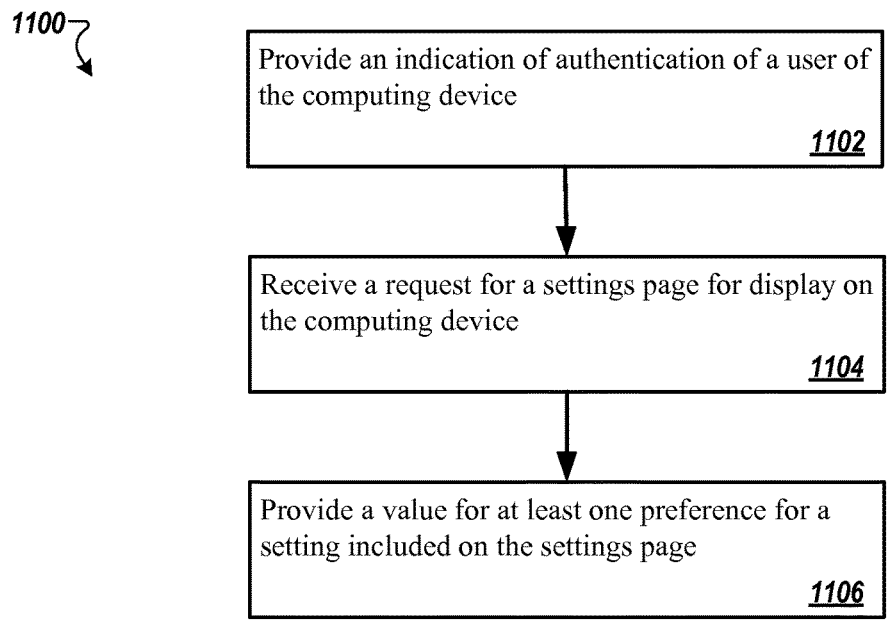
FIG. 11 is a flowchart that illustrates a method for providing authenticated settings/preferences to an authenticated user of an application.

FIG. 11 is a flowchart that illustrates a method 1100 for providing authenticated settings/preferences to an authenticated user of an application. In some implementations, the systems described herein can implement the method 1100. For example, the method 1000 can be described referring to FIGS. 1, 2A-B, 3A-C, 4, and 5.

An indication of authentication of a user of the computing device is provided (block 1102). For example, the computer system 130 can provide an indication of the authentication of a user of the computing device 102 to the web browser application 210 running on the computing device 102 (e.g., as shown in user interface 250). A request for a settings page for display on the computing device is received (block 1104). For example, the computer system 130 can receive a request from the computing device 102 for the settings page (e.g., the setting menu 402) associated with the web browser application 210 and the user. A value for at least one preference for a setting included on the settings page is provided (block 1106). For example, the front-end of the web browser application 210 (the front-end application 164) can render the settings menu 402 that includes the value for the preference (e.g., the indicator 418 indicates the preference for the on startup setting 406 is "open in new tab page"). The value for the preference can be included in a settings/preferences file for the user that is included in the settings/preferences files 150 included in the database 142b. The value for the preference can be signed by the private key 152 that is associated with the user.

Figure 12:
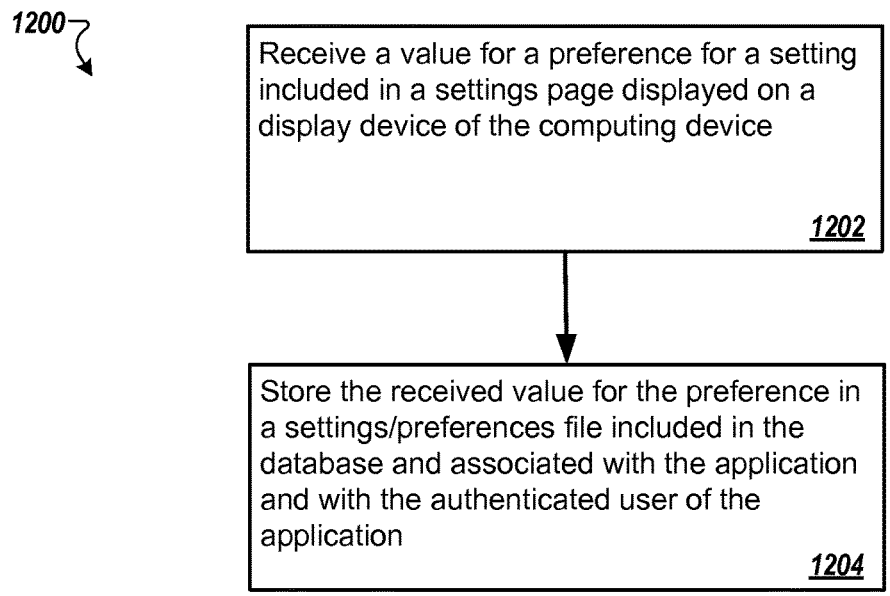
FIG. 12 is a flowchart that illustrates a method for storing settings/preferences of an authenticated user.

FIG. 12 is a flowchart that illustrates a method 1200 for storing settings/preferences of an authenticated user. In some implementations, the systems described herein can implement the method 1200. For example, the method 1000 can be described referring to FIGS. 1, 2A-B, 3A-C, 4, and 5.

A value for a preference for a setting included in a settings page displayed on a display device of the computing device is received (block 1202). The settings page can be associated with the application and with an authenticated user of the application. For example, once a user of the computing device 102 is authenticated, the front-end application 164 can render the settings menu 402 for the web browser application 210 on the display device 120 included in the computing device 102. The web browser application 210 can receive a selection of a preference for a setting included in the settings menu 402. For example, a user can interact with the settings menu 402, selecting indicator 430 for preference 416b ("ask where to save each file before downloading") for the download setting 410. The computing device 102 (e.g., the web browser application 210) receives the selection of the indicator 430 for the preference 416b and sends an indication of the selection (the preference for the download setting 410) to the server 142a (e.g., the front-end application 164).

The received value for the preference is stored in a settings/preferences file included in the database and associated with the application and with the authenticated user of the application (block 1204). For example, the server 142a can store the preference in the settings/preferences file associated with the user and included in the settings/preferences file 150 included in the database 142b.

Figure 13:
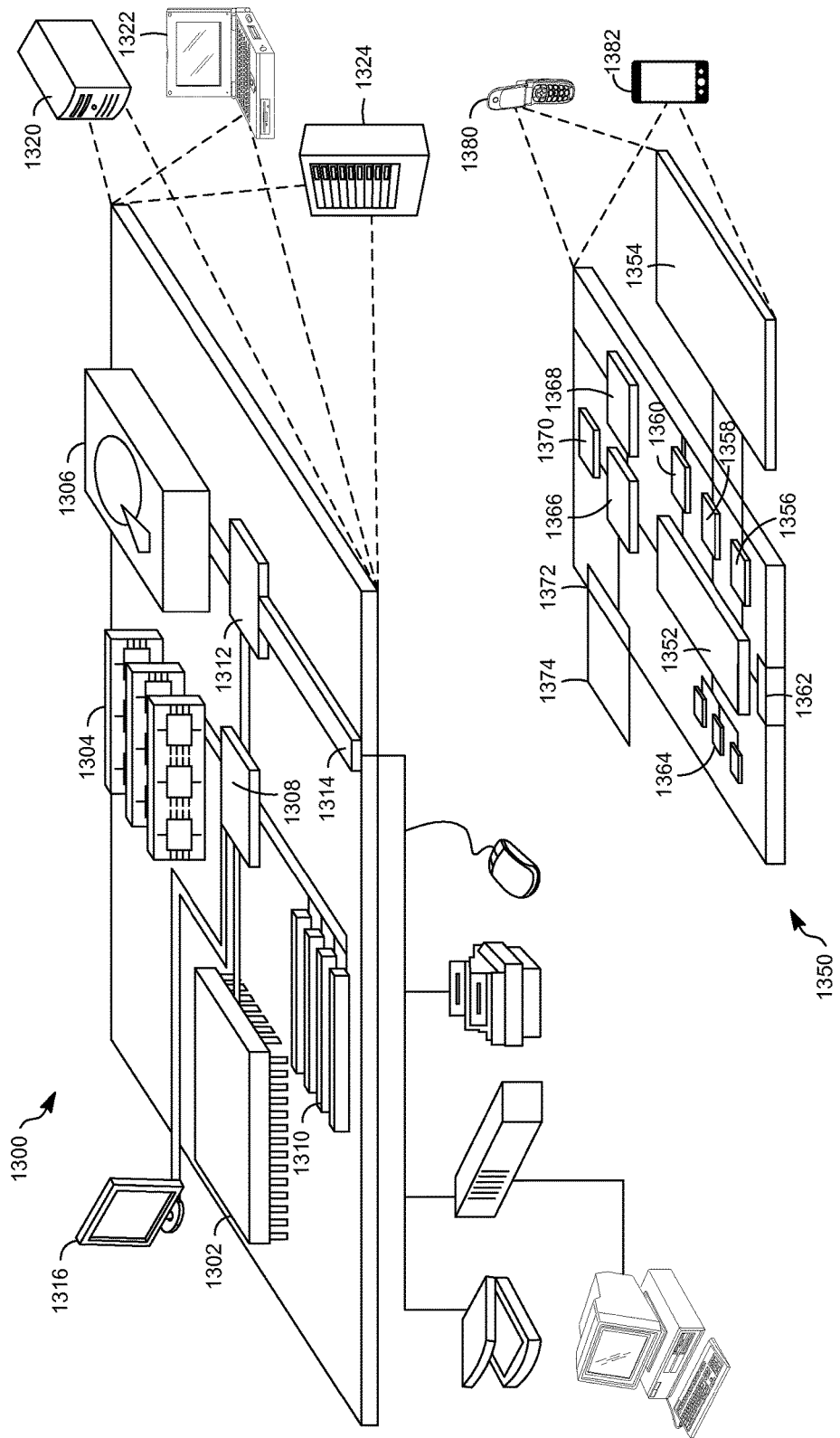
FIG. 13 shows an example of a computer device and a mobile computer device that can be used to implement the techniques described here.

FIG. 13 shows an example of a computer device and a mobile computer device that can be used to implement the techniques described here. FIG. 13 shows an example of a generic computer device 1300 and a generic mobile computer device 1350, which may be used with the techniques described here. Computing device 1300 is intended to represent various forms of digital computers, such as laptops, desktops, workstations, personal digital assistants, servers, blade servers, mainframes, and other appropriate computers. Computing device 1350 is intended to represent various forms of mobile devices, such as personal digital assistants, cellular telephones, smart phones, and other similar computing devices. The components shown here, their connections and relationships, and their functions, are meant to be exemplary only, and are not meant to limit implementations of the inventions described and/or claimed in this document.

Computing device 1300 includes a processor 1302, memory 1304, a storage device 1306, a high-speed interface 1308 connecting to memory 1304 and high-speed expansion ports 1310, and a low speed interface 1312 connecting to low speed bus 1314 and storage device 1306. Each of the components 1302, 1304, 1306, 1308, 1310, and 1312, are interconnected using various busses, and may be mounted on a common motherboard or in other manners as appropriate. The processor 1302 can process instructions for execution within the computing device 1300, including instructions stored in the memory 1304 or on the storage device 1306 to display graphical information for a GUI on an external input/output device, such as display 1316 coupled to high speed interface 1308. In other implementations, multiple processors and/or multiple buses may be used, as appropriate, along with multiple memories and types of memory. Also, multiple computing devices 1300 may be connected, with each device providing portions of the necessary operations (e.g., as a server bank, a group of blade servers, or a multi-processor system).

The memory 1304 stores information within the computing device 1300. In one implementation, the memory 1304 is a volatile memory unit or units. In another implementation, the memory 1304 is a non-volatile memory unit or units. The memory 1304 may also be another form of computer-readable medium, such as a magnetic or optical disk.

The storage device 1306 is capable of providing mass storage for the computing device 1300. In one implementation, the storage device 1306 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 1304, the storage device 1306, or memory on processor 1302.

The high speed controller 1308 manages bandwidth-intensive operations for the computing device 1300, while the low speed controller 1312 manages lower bandwidth-intensive operations. Such allocation of functions is exemplary only. In one implementation, the high-speed controller 1308 is coupled to memory 1304, display 1316 (e.g., through a graphics processor or accelerator), and to high-speed expansion ports 1310, which may accept various expansion cards (not shown). In the implementation, low-speed controller 1312 is coupled to storage device 1306 and low-speed expansion port 1314. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 1300 may be implemented in a number of different forms, as shown in the figure. For example, it may be implemented as a standard server 1320, or multiple times in a group of such servers. It may also be implemented as part of a rack server system 1324. In addition, it may be implemented in a personal computer such as a laptop computer 1322. Alternatively, components from computing device 1300 may be combined with other components in a mobile device (not shown), such as device 1350. Each of such devices may contain one or more of computing device 1300, 1350, and an entire system may be made up of multiple computing devices 1300, 1350 communicating with each other.

Computing device 1350 includes a processor 1352, memory 1364, an input/output device such as a display 1354, a communication interface 1366, and a transceiver 1368, among other components. The device 1350 may also be provided with a storage device, such as a microdrive or other device, to provide additional storage. Each of the components 1350, 1352, 1364, 1354, 1366, and 1368, are interconnected using various buses, and several of the components may be mounted on a common motherboard or in other manners as appropriate.

The processor 1352 can execute instructions within the computing device 1350, including instructions stored in the memory 1364. The processor may be implemented as a chipset of chips that include separate and multiple analog and digital processors. The processor may provide, for example, for coordination of the other components of the device 1350, such as control of user interfaces, applications run by device 1350, and wireless communication by device 1350.

Processor 1352 may communicate with a user through control interface 1358 and display interface 1356 coupled to a display 1354. The display 1354 may be, for example, a TFT LCD (Thin-Film-Transistor Liquid Crystal Display) or an OLED (Organic Light Emitting Diode) display, or other appropriate display technology. The display interface 1356 may comprise appropriate circuitry for driving the display 1354 to present graphical and other information to a user. The control interface 1358 may receive commands from a user and convert them for submission to the processor 1352. In addition, an external interface 1362 may be provide in communication with processor 1352, so as to enable near area communication of device 1350 with other devices. External interface 1362 may provide, for example, for wired communication in some implementations, or for wireless communication in other implementations, and multiple interfaces may also be used.

The memory 1364 stores information within the computing device 1350. The memory 1364 can be implemented as one or more of a computer-readable medium or media, a volatile memory unit or units, or a non-volatile memory unit or units. Expansion memory 1374 may also be provided and connected to device 1350 through expansion interface 1372, which may include, for example, a SIMM (Single In Line Memory Module) card interface. Such expansion memory 1374 may provide extra storage space for device 1350, or may also store applications or other information for device 1350. Specifically, expansion memory 1374 may include instructions to carry out or supplement the processes described above, and may include secure information also. Thus, for example, expansion memory 1374 may be provide as a security module for device 1350, and may be programmed with instructions that permit secure use of device 1350. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 1364, expansion memory 1374, or memory on processor 1352, that may be received, for example, over transceiver 1368 or external interface 1362.

Device 1350 may communicate wirelessly through communication interface 1366, which may include digital signal processing circuitry where necessary. Communication interface 1366 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 1368. In addition, short-range communication may occur, such as using a Bluetooth, WiFi, or other such transceiver (not shown). In addition, GPS (Global Positioning System) receiver module 1370 may provide additional navigation- and location-related wireless data to device 1350, which may be used as appropriate by applications running on device 1350.

Device 1350 may also communicate audibly using audio codec 1360, which may receive spoken information from a user and convert it to usable digital information. Audio codec 1360 may likewise generate audible sound for a user, such as through a speaker, e.g., in a handset of device 1350. Such sound may include sound from voice telephone calls, may include recorded sound (e.g., voice messages, music files, etc.) and may also include sound generated by applications operating on device 1350.

The computing device 1350 may be implemented in a number of different forms, as shown in the figure. For example, it may be implemented as a cellular telephone 1380. It may also be implemented as part of a smart phone 1382, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

The computing system can include clients and servers. A client and server are generally remote from each other and typically interact through a communication network. The relationship of client and server arises by virtue of computer programs running on the respective computers and having a client-server relationship to each other.

In situations in which the systems and methods discussed herein collect personal information about users, or may make use of personal information, the users may be provided with an opportunity to control whether programs or features collect user information (e.g., information about a user's social network, social actions or activities, profession, a user's preferences, or a user's current location), or to control whether and/or how to receive content from the content server that may be more relevant to the user. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over how information is collected about the user and used by a content server.

A number of implementations have been described. Nevertheless, it will be understood that various modifications may be made without departing from the spirit and scope of the specification.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other embodiments are within the scope of the following claims.

What is claimed is:

1. A system comprising:
   a computing device configured to:
      receive a request for a settings page associated with an authenticated user, the request from an application associated with the authenticated user;
      decrypt signed values for preferences for user settings included in the settings page; and
      provide a value for a preference for a user setting included in the settings page;
   a server configured to:
      authenticate the user;
      sign the values for the preferences for the user settings included in the settings page;
      provide the settings page including the signed values for the preferences for the user settings; and
      based on determining that the value for the preference for the user setting is not a valid value, not store the value for the preference in a settings/preferences file associated with the user; and
   a database configured to:
      store user data associated with the user, the user data used by the server to authenticate the user;

store the settings/preferences file associated with the user that includes the values for the preferences for the user settings;

store a private key associated with the user, the private key used by the server for signing the values for the preferences for the user settings; and store a public key associated with an application running on the computing device, the public key used to decrypt the values for the preferences for the user settings signed by the private key.

2. The system of claim 1, wherein the server is further configured to:

host a front-end application associated with the application.

3. The system of claim 2, wherein the computing device is further configured to:

request and receive the settings page from the server using the front-end application.

4. The system of claim 1, wherein decrypting signed values for preferences for user settings included in the settings page includes verifying a signature of a signed value using the public key.

5. The system of claim 1, wherein the computing device is further configured to request the public key that is associated with the application.

6. The system of claim 5, wherein the public key is stored in the database, and wherein the database is remote from the computing device.

7. The system of claim 6, wherein the server is communicatively coupled to the database, and wherein requesting the public key comprises requesting that the server provide the public key to the application.

8. The system of claim 1, wherein the value is a first value and the preference is a first preference, and wherein the server is further configured to receive a second value for a second preference, determine that the second value for the second preference is a valid value, and, based on determining that that the second value for the second preference is a valid value, store the second value for the second preference in the settings/preferences file associated with the user.

9. The system of claim 1, wherein the application is a web browser application.

10. The system of claim 9, wherein the web browser application is configured to read assigned preferences from the settings/preferences file, and store a copy of the settings/preferences file into local memory in an unsigned state.

11. The system of claim 9, wherein the web browser application is configured to read assigned preferences from the settings/preferences file, and store a copy of the settings/preferences file into local memory in a signed state.

12. The system of claim 1, wherein the computing device is further configured to receiving a request for a criterion for user authentication, and provide the criterion, wherein providing the settings page is based on the user being further authenticated using the criterion.

13. The system of claim 1, further comprising an operations analyzer.

14. The system of claim 13, wherein the operations analyzer is configured to perform observation of accesses by the authenticated user of the application.

15. The system of claim 14, wherein the observation includes which settings or preferences are accessed.

16. The system of claim 14, wherein the observation includes how often settings or preferences are accessed.

17. The system of claim 14, wherein the observation includes how often settings or preferences are modified.

18. The system of claim 14, wherein the observation includes what modifications of settings or preferences are made.

* * * * *